United States Patent
Malik et al.

(10) Patent No.: US 6,479,623 B1
(45) Date of Patent: Nov. 12, 2002

(54) AMORPHOUS POLYETHER GLYCOLS BASED ON BIS-SUBSTITUTED OXETANE MONOMERS

(75) Inventors: Aslam A. Malik, Cameron Park; Thomas G. Archibald, Fair Oaks; Roland P. Carlson, Fulsom, all of CA (US); Kenneth J. Wynne, Midlothian, VA (US); Edward N. Kresge, Watchung, NJ (US)

(73) Assignees: Omnova Solutions, Inc., Fairlawn, OH (US); Aerojet-General Corporation, Sacramento, CA (US)

( * ) Notice: Subject to any disclaimer, the term of this patent is extended or adjusted under 35 U.S.C. 154(b) by 39 days.

(21) Appl. No.: 09/615,160

(22) Filed: Jul. 13, 2000

Related U.S. Application Data

(60) Provisional application No. 60/144,375, filed on Jul. 16, 1999.

(51) Int. Cl.$^7$ ........................ C08G 65/22; C07D 305/06
(52) U.S. Cl. ........................................ 528/402; 549/510
(58) Field of Search ........................... 528/402; 549/510

(56) References Cited

U.S. PATENT DOCUMENTS

| | | |
|---|---|---|
| 2,895,921 A | 7/1959 | Price |
| 2,895,924 A | 7/1959 | Hudy |
| 2,895,931 A | 7/1959 | Klug |
| 2,905,647 A | 9/1959 | Goddu |
| 2,909,492 A | 10/1959 | Schilling |
| 3,096,344 A | 7/1963 | Case |
| 3,210,298 A | 10/1965 | Weissermerl et al. |
| 3,347,801 A | 10/1967 | Stogryn |
| 3,576,802 A | 4/1971 | Luders et al. |
| 4,097,048 A | 6/1978 | Falk et al. |
| 4,393,199 A | 7/1983 | Manser |
| 4,414,384 A | 11/1983 | Berkowitz et al. |
| 4,483,978 A | 11/1984 | Manser |
| 4,675,452 A | 6/1987 | Lagow et al. |
| 4,707,510 A | 11/1987 | Manser et al. |
| 4,764,586 A | 8/1988 | Manser et al. |
| 4,827,042 A | 5/1989 | Lagow et al. |
| 4,847,427 A | 7/1989 | Nappa |
| 4,864,040 A | 9/1989 | Oshaka et al. |
| 4,898,987 A | 2/1990 | Falk et al. |
| 4,946,992 A | 8/1990 | Falk et al. |
| 4,965,342 A | 10/1990 | Vandenberg et al. |
| 4,970,295 A | 11/1990 | Schuchardt |
| 4,986,797 A | 1/1991 | Wardle et al. |
| 5,000,830 A | 3/1991 | Marchionni |
| 5,097,048 A | 3/1992 | Falk et al. |
| 5,463,084 A | 10/1995 | Crivello ................ 579/214 |
| 5,650,453 A | 7/1997 | Malik et al. ............ 549/511 |
| 5,654,450 A * | 8/1997 | Malik et al. ............ 549/511 |
| 5,668,250 A | 9/1997 | Malik et al. ............ 549/511 |
| 5,668,251 A | 9/1997 | Malik et al. ............ 549/511 |
| 5,703,194 A | 12/1997 | Malik et al. ............ 549/511 |
| 5,807,977 A | 9/1998 | Malik et al. ............ 549/511 |
| 6,037,483 A | 3/2000 | Malik et al. ............ 549/511 |
| 6,380,351 B1 | 4/2002 | Malik et al. |

FOREIGN PATENT DOCUMENTS

| | | |
|---|---|---|
| DE | 4323307 | 1/1994 |
| EP | 348350 A1 | 12/1989 |
| EP | 430887 A2 * | 6/1991 |
| GB | 2269816 A * | 2/1994 |
| WO | WO00/46270 | 8/2000 |

OTHER PUBLICATIONS

Chemical abstracts accession No. 1976:561195 for Soviet Union Patent No. 523,910, Perm Polytechnic Institute, USSR, Aug. 5, 1976.*
Ameduri, et al., *Journal of Fluorine Chemistry*, 65:43–47 (1993).
Beyaert, et al., *Chemical Abstracts*, 37(18):5373 (1943).
Clark, et al., *Macromolecules*, 28:3002–4 (1995).
Karam, "Synthese de Diols Telecheliques Halogenes Par Polymerization Cationique D'Oxetanes," Ph.D. Thesis, Ecole Nationale Superieure Chimie, MontPellier, France, pp. 114–147 (1991).
Karam, "Thesis Abstract, Ecole Nationale Superieure Chimie," Montpellier, France, pp. 1–22 and 1–4 (1992).
Miura, et al., *Chemical Abstracts*, 52(3):2829 (1964).
Petrova, et al., *Chemical Abstracts*, 64(10):14153 (1966).
Vakhlamova, et al., *Chemical Abstracts*, 89:110440 (1979).
Vakhlamova, et al., *Zh. Vses. Khim. O–va.*, 23(3):357–359 (1978).
Zarudii, et al., *Chemical Abstracts*, 103(0):633 (1985).

* cited by examiner

*Primary Examiner*—Robert E.L. Sellers
(74) *Attorney, Agent, or Firm*—Townsend and Townsend and Crew LLP

(57) ABSTRACT

This invention is directed to mono- and bis-substituted oxetane monomers having fluorinated alkoxymethylene side chains, hydroxy-terminated prepolymers derived from these mono- and bis-substituted oxetane monomers and tetrahydrofuran (THF), and polymers produced from these prepolymers, as well as the synthesis processes associated with each, and the use of the monomers, prepolymers and ultimate polymers, both directly and as components of numerous compositions.

17 Claims, 1 Drawing Sheet

AMORPHOUS POLYETHER GLYCOLS BASED ON BIS-SUBSTITUTED OXETANE MONOMERS

This application is a continuation-in-part of and claims the benefit of U.S. Provisional Application No. 60/144,375, filed Jul. 16, 1999the disclosure of which is incorporated by reference.

FIELD OF INVENTION

The present invention relates generally to amorphous polyether glycols based on bis-substituted oxetane monomers. More particularly, the present invention relates to hydroxy-terminated prepolymer compositions and to the polymers derived therefrom, oxetane monomers having bis-substituted pendant fluorinated alkoxymethylene groups as the prepolymer precursors, methods for preparing the precursor monomers and methods for polymerizing the prepolymers to form fluorinated elastomers. The hydroxyterminated prepolymers have a polyether backbone and are useful, inter alia, for the preparation of elastomers, thermoset plastics and coatings. These compositions exhibit hydrophobic properties, very low surface energies, low glass transition temperatures, low dielectric constants, high abrasion resistance and tear strength, low coefficient of friction, high adhesion and low refractive indices.

BACKGROUND OF THE INVENTION

Fluorinated polymers enjoy widespread use as hydrophobic, oleophobic coatings. These materials exhibit excellent environmental stability, high hydrophobicity, low surface energy and a low coefficient of friction, and are used in a number of applications ranging from nonstick frying pans to optical fiber cladding. Most fluoropolymers, however, are plastics that are difficult to process, difficult to apply and are unsuitable as coatings for flexible substrates due to their high rigidity. One example of a widely used fluorinated material is TEFLON™, a polytetrafluoroethylene. TEFLON™ is difficult to process in that it is a rigid solid that must be sintered and machined into its final configuration. Commercial application of TEFLON™ as a coating is complicated by its poor adhesion to substrates and its inability to form a continuous film. As TEFLON™ is insoluble, application of a TEFLON™ film involves spreading a thin film of powdered TEFLON™ onto the surface to be coated and, thereafter, the powdered TEFLON™ is sintered in place resulting in either an incomplete film or a film having many voids. As TEFLON™ is a hard inflexible plastic, a further limitation is that the substrate surface must be rigid, otherwise the TEFLON™ will either crack or peel off.

A limited number of commercial fluoropolymers, such as Viton, possess elastomeric properties. However, these materials have relatively high surface energies (as compared to TEFLON™), poor abrasion resistance and tear strength, and their glass transition temperatures are still high enough (greater than 0° C. for Viton) to significantly limit their use in low-temperature environments.

Accordingly, there is a need for fluoroelastomers having hydrophobic properties, surface energies and coefficients of friction at least equivalent to the fluorinated plastics (such as TEFLON™). Further, such fluoroelastomers must have high adhesion, high abrasion resistance and tear strength, low index of refraction and low glass transition temperatures so that they are suitable for any foreseeably low temperature environmental use. In addition, there is a need for fluoroelastomers that are easily produced in high yields and easy to use.

The most important criteria in the development of release (i.e., nonstick), high lubricity coatings is the minimization of the free surface energy of the coating. Free surface energy is a measure of the wettability of the coating and defines certain critical properties, such as hydrophobicity and adhesive characteristics of the material. For most polymeric surfaces, the surface energy can be expressed in terms of the critical surface tension of wetting $a_C$. For example, the surface energy of TEFLON™ (represented by $\tilde{a}_C$) is 18.5 ergs/cm$^2$, whereas that of polyethylene is 31 ergs/cm$^2$. Consequently, coatings derived from TEFLON™ are more hydrophobic and nonstick than those derived from polyethylene. A substantial amount of work has been done by the coating industry to develop coatings having surface energies lower than or comparable to TEFLON™, while at the same time exhibiting superior adhesion characteristics.

The literature teaches that in order to prepare coatings having the desirable low surface energy, the surface of the coating must be dominated by —CF$_3$ groups. Groups such as —CF$_2$—H and —CFH$_2$ increase the surface energy of the material. The importance of the number of fluorine atoms in the terminal group (i.e., the group present on the surface) was demonstrated by Zisman, et al., *J. Phys. Chem.*, 57:622 (1953); Zisman, et al., *J. Colloid Sci.*, 58:236 (1954); and Pittman, et al., *J. Polymer Sci.*, 6:1729 (1968). It was found that materials with terminal —CF$_3$ groups exhibited surface energies in the neighborhood of 6 ergs/cm$^2$, whereas similar materials with terminal —CF$_2$H groups exhibited values in the neighborhood of 15 ergs/cm$^2$, i. e., more than twice the value for the material with terminal —CF$_3$ groups. TEFLON™ incorporates the fluorine moieties on the polymer backbone and does not contain pendant —CF$_3$ groups. Consequently, TEFLON™ does not exhibit surface energies as low as polymers having terminal perfluorinated alkyl side chains.

A critical requirement in the production of an elastomer is that the elastomer have large zones, or "soft segments," where little or no crosslinking occurs and where the polymer conformation is such that there is little or no compaction of the polymer as a result of crystallization. Intermediate of these soft zones are "hard blocks," where there may be significant hydrogen bonding, crosslinking and compaction of the polymer. It is this alternating soft block and hard block that give the polymer its elastomeric properties. The longer the soft segment, the more elastic the elastomer.

Falk, et al. (U.S. Pat. No. 5,097,048) disclose the synthesis of bis-substituted oxetane monomers having perfluoro-terminated alkyl group side chains from bis-haloalkyl oxetanes, the glycols having perfluoro-terminated alkyl group side chains derived therefrom, including related thiol and amine linked glycols and dimer diols. Most of the fluorinated side chains are attached to the glycol unit by a thio, an amine or a sulfonamide linkage. Only a few examples describe glycols having perfluoro-terminated alkoxymethylene side chains; however, such glycols are crystalline materials.

Falk, et al. (EP 03 48 350) report that their process yields perfluoro-terminated alkoxymethylene neopentyl glycols composed of a mixture of (1) approximately 64% of a bis-substituted perfluoro-terminated alkyl neopentyl glycol, and (2) approximately 36% of a mono-substituted perfluoro-terminated alkyl neopentyl glycol product with a pendant chloromethyl group. Evidently, the mono-substituted product results from incomplete substitution of the second chloride on the bis-chloroalkyl oxetane starting material. Consequently, as noted from the Zisman and Pittman work described above, the presence of the —CH$_2$Cl as a side chain significantly increases the surface energy of the coatings made from these polymers, thereby reducing the hydrophobicity and oleophobicity of the coatings.

Falk, et al. U.S. Pat. No. 5,045,624) teaches preparation of dimers with fluorinated side chains having thio linkages, but not of dimers with fluorinated ether side chains. This is because the synthesis route used by Falk, et al. for preparing dimers with thio linkages cannot be used for the synthesis of dimers with ether linkages. In other words, Falk, et al. do not teach preparation of long chain polyethers with fluorinated ether side chains.

Falk, et al. (U.S. Pat. No. 4,898,981) teaches incorporation of their bis-substituted glycols into various foams and coatings to impart the desired hydrophobicity and oleophobicity. Classic polyurethane chemistry shows that while a plastic may form by reaction of Falk's glycols with diisocyantes, elastomers cannot form since there is no long chain soft segment. Such a soft segment is needed for the formation of an elastomer. Since the compounds of Falk, et al. are only one or two monomer units long, they are clearly too short to function as a soft segment for the formation of a polyurethane elastomer. In Falk, et al., the fluorinated glycol and isocyanate segments alternate, with the fluorinated glycol segments, being nearly the same size as the isocyanate segments. It is well known to those of skill in the art that such a polymer structure will not yield elastomers.

None of the Falk, et al. references teach or show a homoprepolymer or coprepolymer made from bis-perfluoroterminated alkoxymethylene oxetanes, nor polyurethanes derived therefrom or from the corresponding glycols. All of their polyurethanes are made directly from the thiol-linked monomers and dimers and not via a prepolymer intermediate. In the examples provided in Falk, et al. U.S. Pat. No. 5,045,624), particularly where the perfluoro-terminated side chains are large and for all of the dimers, all have thiol linkages, i.e., no ether side chains are shown. The polyurethanes disclosed by Falk, et al. (U.S. Pat. No. 4,898,981) are made from the perfluoro-terminated alkylthio neopentyl glycol. However, Falk, et al. (U.S. Pat. No. 5,097,048) in Example 12, show a polyether prepolymer prepared from a bis-substituted perfluoroalkylthio oxetane. The prepolymer obtained was a white waxy solid, clearly not an elastomer. No characterization as to the nature of the end groups, polydispersity, equivalent weights, etc. of the waxy solid was given. Absent such a characterization, it is unknown whether the material of Falk, et al. may be further reacted with an isocyanate to produce a polyurethane polymer. No examples of the preparation of a polymer from any prepolymer is given.

Vakhlamova (*Chem. Abst.* 89:110440p) teaches the synthesis of oxetane compounds substituted at the number 3 carbon of the oxetane with —$CH_2O$—$CH_2$—$CF_2$—$CF_2$—H groups. The terminal alkyl portion of this substituent is thus: —$CF_2CF_2$—H, wherein the terminal or omega carbon bears a hydrogen atom. As discussed above, the Zisman and Pittman work shows that the presence of the hydrogen significantly increases the surface energy of the polymer derived from these monomers. Falk, et al. (U.S. Pat. No. 5,097,048) also recognizes that surface energy increases with the hydrogen atom on the terminal carbon by stating that "fluoroalkyl compounds which are terminally branched or contain omega-hydrogen atoms do not exhibit efficient oil repellency." Further, Vakhlamova focuses on the bis-substituted monomer as he hydrolyzes the monomer and then polymerizes the resultant monomeric glycol.

A characteristic of the polymers formed from the polymerization of the bis-substituted oxetanes of Falk, et al., and the other proponents of bis-substituted oxetanes is that the resulting products are crystalline solids. The bis-side chains are highly ordered and symmetric. Consequently, they pack efficiently to form a crystalline structure. For example, a prepolymer prepared from 3,3-bis-(chloromethyl)oxetane is a crystalline solid that melts in the neighborhood of 220° C. This significantly affects the commercial use of these polymers since either or both mixing and elevated temperatures will be required in order to dissolve or melt the Falk, et al. polymer for further polymerization or application.

As such, to date, the polymerization of the bis-substituted perfluorinated alkoxymethylene oxetanes has not resulted in useful materials. The polymers derived from the bis-substituted perfluoroalkylthiol oxetanes are waxy solids and will not function as a soft segment in the preparation of commercially useful elastomers and coatings. Further, the ability of a bis-substituted oxetane monomer to homopolymerize appears to be dependent upon the nature of the side chain at the 3-carbon with no assurance that polymerization will occur, the difficulty of polymerization apparently being due to the steric interference by the side chains. Polymerization, and the products of polymerization, of the bis-substituted monomer accordingly are unpredictable and inconsistent.

U.S. Pat. Nos. 5,654,450, 5,668,251, 5,650,483, 5,668,250 and 5,703,194, all of which have issued to Malik, et al., disclose fluorinated elastomers and a production strategy therefor, beginning with a premonomer production process that is easy and inexpensive, to produce an asymmetrical mono-haloalkyl methyl oxetane premonomer, which upon further reaction produces an oxetane monomer having a single fluorinated side chain, which mono-substituted fluorinated monomer is capable of homopolymerization and copolymerization to produce an essentially non-crosslinked soft segment, difunctional, linear, asymmetric prepolymer for further reaction to produce fluorinated elastomers and thermoset plastics, resins and coatings having hydrophobic properties, low surface energy, very low glass transition temperatures, low dielectric constants, high abrasion resistance and tear strength, high adhesion and low refractive indices.

The contributions of U.S. Pat. Nos. 5,654,450, 5,668,251, 5,650,483, 5,668,250 and 5,703,194 have resulted in very useful fluorinated elastomers and methods for their preparation. However, it would be advantageous if bis-substituted fluorinated oxetane monomers could be homopolymerized and copolymerized to produce essentially non-crosslinked, difunctional, linear, asymmetric prepolymers that, in turn, could be further reacted to produce fluorinated elastomers and thermoset plastics, resins and coatings having useful properties, a goal which researchers have not yet achieved despite great efforts in this area. The present invention achieves this and other goals.

SUMMARY OF THE INVENTION

Prior to the present invention, the use of bis-substituted fluorinated oxetane monomers (i.e., bis-substituted FOX monomers) in the synthesis of fluoroelastomers has been limited due to the highly crystalline nature of the polymer formed from these symmetrical monomers. However, it has been discovered that this problem can be overcome by copolymerizing the bis-substituted fluorinated oxetane monomers with mono-substituted fluorinated oxetane monomers and/or nonfluorinated oxetane monomers, such as tetrahyrofuran ("THF"), to produce amorphous polyether glycols. Such glycols can be incorporated into a polymer matrix to produce an elastomer which, in turn, can be used for a variety of applications including, for example, antigraffiti coatings, wall paper coatings, automotive coatings, fouling release coatings for ship hulls, pyrotechnic applications, etc. In addition to lowering the cost of the raw materials, the present invention provides materials having higher amounts of fluorine at the surface, thereby increasing the performance characteristics of poly(FOX) coatings.

As such, in one aspect, the present invention provides hydroxy-terminated polyether prepolymers having asymmetric, alkoxymethylene side chains with terminal perfluorinated alkyl groups. In one embodiment, the prepolymers comprise a monomeric unit having the following general formula:

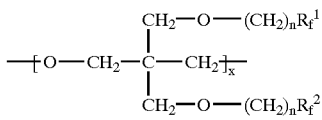

In the above formula, each n is independently selected and is 1 to 3; $R_f^1$ and $R_f^2$ are independently selected from the group consisting of linear perfluorinated alkyls, linear perfluorinated isoalkyls, branched chain perfluorinated alkyols, branched perfluorinated isoalkyls, the perfluorinated alkyls and isoalkyls having from 1 to about 20 carbon atoms, and oxaperfluorinated polyethers having from 4 to about 60 carbon atoms; and x is 1 to about 250 and, more preferably, 2 to about 100. It is noted that $R_f^1$ and $R_f^2$ are selected so that they are different and have a more or less random placement along the prepolymer chain.

In another embodiment, the prepolymers comprise a mixture of monomeric units have the following general formulae:

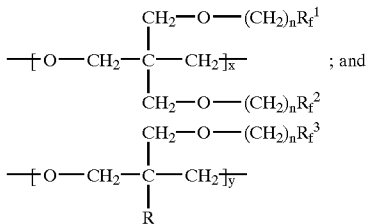

In the above formula, each n is independently selected and is 1 to 3; R is selected from the group consisting of methyl and ethyl; $R_f^1$, $R_f^2$ and $R_f^3$ are independently selected from the group consisting of linear fluorinated alkyls, linear fluorinated isoalkyls, branched chain fluorinated alkyls, branched fluorinated isoalkyls, the fluorinated alkyls and isoalkyls having from 1 to 20 carbon atoms, and oxaperfluorinated polyethers having from 4 to about 60 carbon atoms; x is about 1 to about 250 and, more preferably, 2 to about 100; and y is about 1 to about 250 and, more preferably, 2 to about 100. Typically, the ratio of di- to mono-substituted monomers, i.e., the ratio of x to y, is from about 95:5 to about 5:95, more preferably about 70:30 and, even more preferably, about 50:50, with a DP of about 1 to about 250 and, more preferably, of about 5 to about 100.

In another aspect, the present invention provides a hydroxy-terminated polyether coprepolymer having alkoxymethylene side chains with terminal perfluorinated alkyl groups and a backbone composed of FOX monomer segments and of tetrahydrofuran (THF) segments. In one embodiment, the FOX/THF coprepolymer comprises a mixture of monomeric units having the following general formulae:

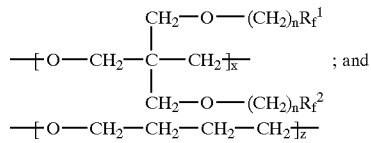

In the above formulae, n is independently selected and is 1 to 3; $R_f^1$ and $R_f^2$ are independently selected from the group consisting of linear perfluorinated alkyl groups having 1–20 carbons, branched perfluorinated alkyl groups having 1–20 carbons and oxaperfluorinated polyethers having from about 4–60 carbons; x is about 1 to about 250 and, more preferably, 1 to about 100; and z is about 1 to about 250 and, more preferably, 1 to 100. Typically, the ratio of di- to mono-substituted monomers, i.e., the ratio of x to z, is from about 1:99 to about 99:1, with a DP of about 1 to about 250 and, more preferably, of about 5 to about 100. Moreover, typically, the molecular weight ($M_n$) of the FOX/THF coprepolymers ranges from about 2,000 to about 50,000 and, more preferably, from about 2,000 to about 15,000; and the $T_g$ is less than –20° C.

In another embodiment, the FOX/THF coprepolymers of the present invention comprise a mixture of monomeric units having the following general formulae:

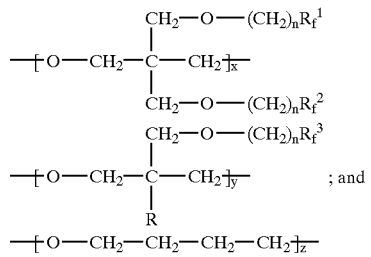

In the above formulae, each n is independently selected and is 1 to 3; R is selected from the group consisting of methyl and ethyl; $R_f^1$, $R_f^2$ and $R_f^3$ are independently selected from the group consisting of linear perfluorinated alkyl groups having 1–20 carbons, branched perfluorinated alkyl groups having 1–20 carbons and oxaperfluorinated polyethers having from about 4–60 carbons; x is 1 to about 250 and, more preferably, 2 to about 100; y is 1 to about 250 and, more preferably, 2 to about 100; and z is 1 to about 250 and, more preferably, 1 to about 100. Typically, such FOX/THF coprepolymers have a DP of about 1 to about 250 Moreover, typically, the molecular weight ($M_n$) of the FOX/THF coprepolymers ranges from about 2,000 to about 50,000 and, more preferably, from about 2,000 to about 15,000; and the $T_g$ is less than –20° C.

The foregoing prepolymers and coprepolymers can be used, inter alia, as components in coating compositions, resins, lubricants and oils, which impart hydrophobic properties, low surface energies, low coefficient of friction, very low glass transition temperatures, low dielectric constants, high abrasion resistance and tear strength, high adhesion and low refractive indices to such coating, resins, lubricants and oils.

In another aspect, the present invention provides fluorinated elastomers and thermoset plastics having fluorinated alkoxymethylene side chains and having good hydrophobic properties, low surface energies, very low glass transition temperatures, low dielectric constants, high abrasion resistance and tear strength, high adhesion and low refractive indices. In one embodiment, the fluorine-containing thermoplastic polyurethane elastomer of this invention comprises a mixture of monomeric units having the following general formulae:

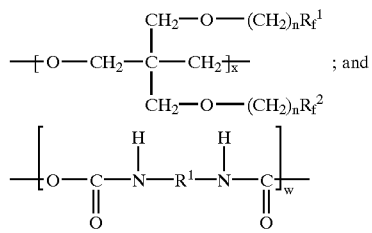

In the above formula, n is independently selected and is 1 to 3; $R_f^1$ and $R_f^2$ are independently selected from the group consisting of linear and branched perfluorinated alkyls having 1–20 carbon atoms, and oxaperfluorinated polyethers having from about 4–20 carbon atoms; $R^1$ is a divalent hydrocarbyl radical; x is 1 to about 250 and, more preferably, 2 to about 100; and w is 1 to about 50 and, more preferably, 1 to about 5. It is noted that $R_f^1$ and $R_f^2$ are selected such that they are different. Examples of suitable divalent hydrocarbyl radicals include, but are not limited to, the following structures:

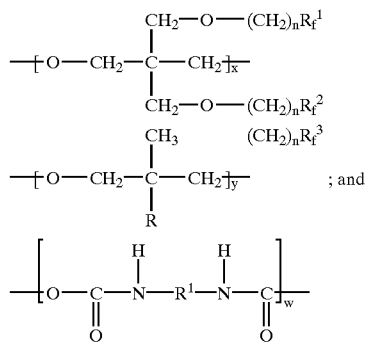

In another embodiment, the fluorine-containing thermoplastic polyurethane elastomer of this invention comprises a mixture of monomeric units having the following general formulae:

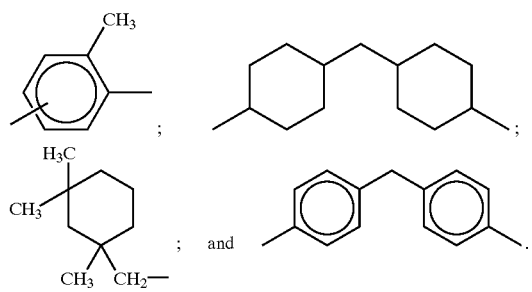

In the above formula, n is independently selected and is 1 to 3; R is selected from the group consisting of methyl and ethyl; $R_f^1$, $R_f^2$ and $R_f^3$ are independently selected from the group consisting of linear and branched perfluorinated alkyls having 1–20 carbon atoms, and oxaperfluorinated polyethers having from about 4–20 carbon atoms; $R^1$ is a divalent hydrocarbyl radical; x is 1 to about 250 and, more preferably, 2 to about 100; y is 1 to about 250 and, more preferably, 2 to about 100; and w is 1 to about 50 and, more preferably, 1 to about 5.

The fluorinated elastomers and plastics of the present invention are useful as fouling and ice release coatings, drag reduction coatings, moisture barrier coatings; catheters; artificial prosthesis components, such as joints, hearts, and valves; contact lenses; intraocular lenses; films, paints; adhesives; nontransfer cosmetics; water repellent coatings; oil/stain resistant coatings; incendiary binders; lubricants, and the like.

In addition, the present invention provides the synthesis processes associated with the monomers, prepolymers and polymer compositions, and the use of the monomers, prepolymers and ultimate polymers, both directly and as components of numerous compositions.

Other features, objects and advantages of the invention and its preferred embodiments will become apparent from the detailed description which follows.

DEFINITIONS

Figure 1:
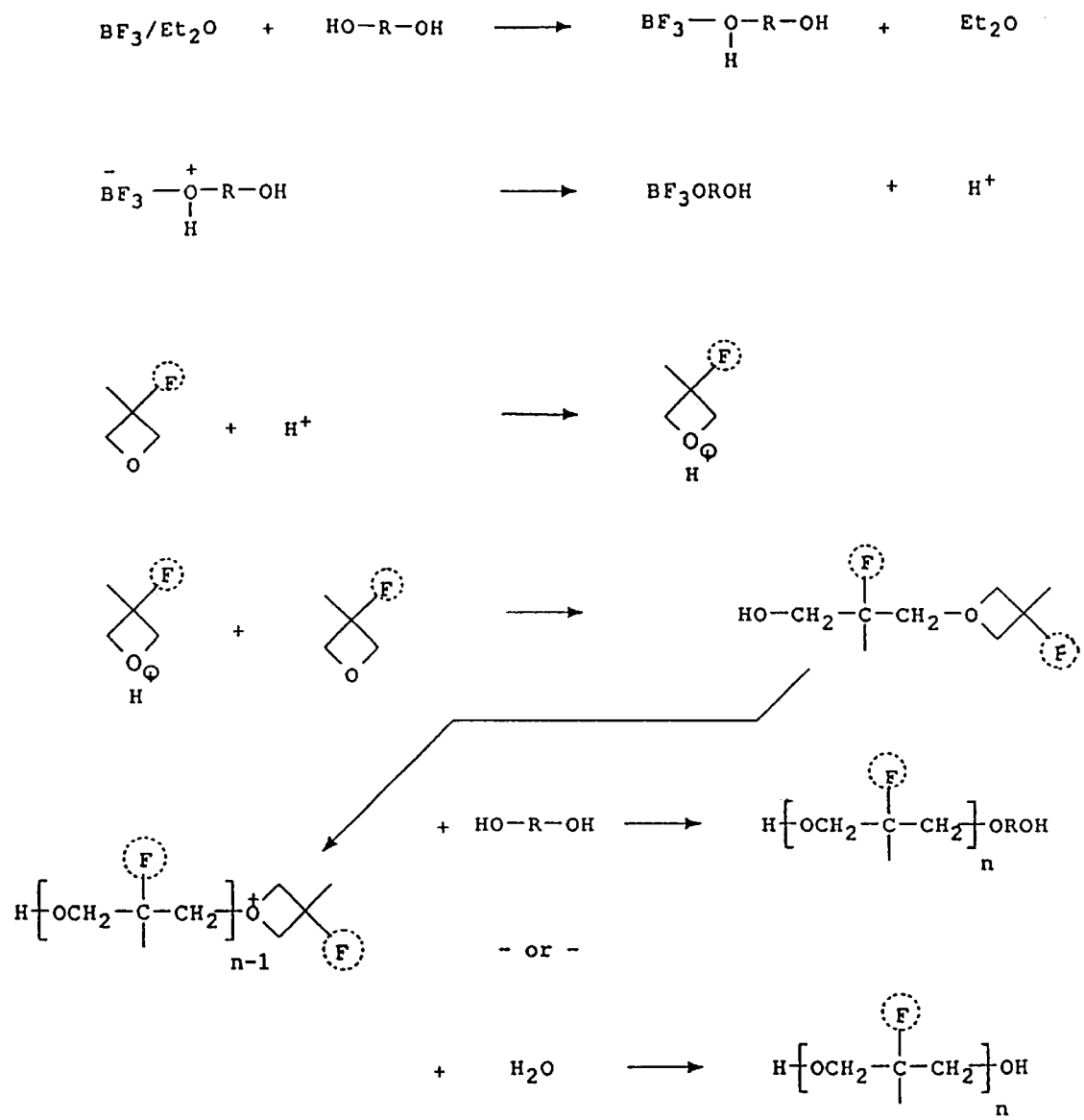
FIG. 1 is a summary of the polymerization reaction of FOX monomers by cationic ring-opening reaction.

"Aprotic Solvent," as used herein, refers to a solvent that does not donate a proton.

"BrMMO," as used herein, refers to 3-bromomethyl-3-methyloxetane.

"Contact Angle," as used herein, refers to the obtuse or internal angle between the surface of a liquid and the surface of an object in contact with the liquid. A high contact angle corresponds to high hydrophobicity.

"FOX Copolymerization," as used herein refers to the reaction of a FOX monomer with either a different FOX monomer or a nonfluorinated monomer to produce a FOX coprepolymer.

"DSC," as used herein, is the acronym for a differential scanning calorimeter, a device used for determining a compounds glass transition temperature.

"Elastomer," as used herein, refers to a polymeric material, such as rubber, which can be stretched under low stress to at least twice its original length and, upon immediate release of the stress, will return with force to its approximate original length.

"FOX," as used herein, is the acronym for Fluorinated OXetane. As used in the disclosure of this invention the term "FOX" is normally preceded by a number; e.g., 3-FOX, 7-FOX, etc. The numerical designation indicates the number of fluorine moieties on the single fluorinated side chain on the 3-carbon of the FOX monomer.

"GLC," as used herein, is the acronym for gas-liquid chromatography. A device and method used as a separation technique to determine purity and percent conversion of the starting materials.

"GPC," as used herein, is the acronym for gel permeation chromatography. A device and method used to determine molecular weight.

"HMMO," as used herein, is the acronym for 3-hydroxymethyl-3-methyloxetane, an intermediate in the production of the arylsulfonate oxetane remonomer.

"FOX Homoploymerization," as used herein, refers to the reaction of a FOX monomer with itself to produce a FOX homoprepolymer.

"Hydrophobicity," as used herein, refers to the degree to which a substance lacks an affinity for, or repels, or fails to absorb water.

"Lewis Acid," as used herein, refers to a substance that can accept an electron pair from a base. For example, $AlCl_3$ and $BF_3$ are Lewis acids.

"Mono-substituted Oxetane," as used herein, refers broadly to a non-bis substituted oxetane compound. More specifically, it refers to the premonomers (e.g. 3-halomethyl-3-methyloxetane) and FOX monomers of this invention where the 3-carbon of the oxetane ring is substituted with only one fluorinated side chain and the other 3-carbon side group is a nonfluorinated moiety, e.g., a methyl or ethyl group.

"Bis-substituted Oxetane," as used herein, refers broadly to a non-mono substituted oxetane compound. More specifically, it refers to the premonomers (e.g., 3,3-bis-halomethyloxetane) and FOX monomers of this invention where the 3-carbon of the oxetane ring is substituted with two fluorinated side chains. It is important to note that the two fluorinated side chains can be the same or different.

"FOX Monomer," as used herein, refers to a mono-substituted or bis-substituted fluorinated oxetane or FOX.

"Phase Transfer Catalyst," as used herein, refers to a catalyst that effectuates or mediates reactions in a dual-phase heterogeneous reaction mixture.

"FOX Premonomer," as used herein, refers to the 3-haloalkane-3-methyloxetane compounds or the 3,3-bis-haloalkaneoxetane compounds that, upon reaction with fluorinated alkoxides, yields the FOX monomers of this invention.

"FOX Prepolymer," as used herein, refers to a hydroxy terminated, polyether oligomer comprising from about 1 to about 250 FOX or FOX/THF monomer units which, upon reaction with a polyisocyanate, will yield polyurethane elastomers.

"Tetrahydrofuran," as used herein, refers to the commercially available 5-membered cyclic ether, which is abbreviated THF.

"TME," as used herein, is the acronym for 1,1,1-tris(hydroxymethyl)ethane, the starting material for the BrMMO premonomer synthesis.

DESCRIPTION OF THE SPECIFIC EMBODIMENTS

A. GENERAL OVERVIEW

This invention is directed to mono- and bis-substituted oxetanes monomers having fluorinated alkoxymethylene side chains, hydroxy-terminated prepolymers derived from these monomers and tetrahydrofuran (THF), and polymers produced from these prepolymers, as well as the synthesis processes associated with each, and the use of the monomers, prepolymers and ultimate polymers, both directly and as components of numerous compositions.

The monomers, polyether hydroxy-terminated prepolymers and resulting compositions thereof are particularly useful for the preparation of polyurethane elastomers, thermoset plastics and coatings that exhibit a wide variety of useful properties including, inter alia, hydrophobic properties, low surface energies, low glass transition temperatures, low dielectric constants, high abrasion resistance and tear strength, low coefficients of friction, high adhesion and low refractive indices. More particularly, examples of the ways in which the incorporation of fluorine into a polymer can alter the properties of the resulting polymer are set forth below.

1. Thermal stability is increased, thereby extending the upper use temperature of the polymer and allowing these materials to be processed at higher temperatures without degradation and, thus, making them suitable for use in environments where other hydrocarbon based polymers cannot be used.
2. Surface energy is decreased, thereby improving the release characteristics of the polymer making it suitable for use as backings for adhesive tapes, as release coatings for molds, as fouling release coatings for ship hulls, and the like.
3. Refractive index of the resulting polymer is reduced, thereby making it useful for optical applications, such as contact lenses, intraocular lenses, coatings for optical instruments, cladding for optical fibers, and the like.
4. Coefficient of friction is reduced, thereby improving the lubricity of the coating making it useful in applications such as vehicle seals, windshield wipers, drag reducing coatings for sail boats, airplanes, etc.
5. Hydrophobicity is increased, thereby improving water repellency and moisture barrier characteristics making the polymer useful for encapsulating electronic devices and as moisture barrier films and coatings, rain erosion coatings, anticorrosion coatings, etc.
6. Oleophobicity is increased, thereby making the polymer oil repellent and, thus, useful as a stain resistant coating for garments and carpets.
7. Flammability is decreased, thereby improving flame retardency, for example, on garments coated with the polymer.
8. Environmental stability of the polymer is improved, thereby making the polymer more stable when exposed to ultraviolet light and moisture.

As a result of the above beneficial properties, a major application of the polymers of the present invention is for nonstick coatings as a result of the fact that the adhesion properties of the polymers of this invention are better than TEFLON™, the surface energy is lower, application is easier, and the applied film is flexible with good abrasion resistance and tear strength, thereby permitting application to both flexible and rigid surfaces. Example of suitable applications include, but are not limited to, anti-fouling coatings, ice release coatings, flexible optical fiber cladding, conduit and aqueduct coatings or linings, surface coatings, anti-graffiti coatings, automotive top-coat compositions (e.g., car wax), particularly at low temperatures due to low glass transition temperatures on the order of −40° C. to −50° C. The low index of refraction and good oxygen permeability, coupled with the optical clarity of some of the elastomers produced from the prepolymers, make them useful for contact lenses and intraocular lenses. Of course, other uses for elastomers are well known to those of skill in the art, and the improved properties of the elastomers of this invention permit an even wider range of uses.

Bis-substituted, either symmetrically or asymmetrically substituted, are used to produce homo- or coprepolymers characterized as non-crosslinked, asymmetrical, hydroxy-terminated, linear oligomers having from about 10 to about 500 carbons and, more preferably, from about 20 to about 200 carbons, i.e., FOX prepolymers. These prepolymers are crucial to the production of fluorinated elastomers in that they substantially retain their integrity in subsequent polymerizing reactions (e.g., reactions with diisocyanates or polyisocyanates) to provide the soft segment blocks of the resulting polymers which, in combination with the hard blocks formed during polymerization, produce good elastomers. Although prior to the present invention there was no showing of copolymerization of the bis-substituted FOX monomers with either mono-substituted FOX monomers or other cylcic ethers to produce prepolymers containing soft segment required for production of elastomers, the processes of the present invention readily polymerize bis-substituted FOX monomers with both mono-substituted FOX monomers and other cylcic ethers. The reaction mechanism of the processes of the present invention produce prepolymers from mono- and bis-substituted FOX monomers and other cyclic ethers (e.g., THF) in high yields.

Although the coprepolymers composed of bis-substituted/mono-substituted FOX comonomers and of FOX/THF comonomers contain fewer fluorine moieties than bis-substituted prepolymers, they surprisingly produce polymers that have similar surface energies to a polymer derived from prepolymers having two fluorinated side chains. Further, even though the FOX/THF prepolymers of the present invention contain less fluorine than the FOX prepolymers of the present invention, the elastomers produced from the FOX/THF prepolymers surprisingly exhibit surface and physical properties comparable to the elastomers produced from the FOX prepolymers.

In addition, a polymerization process has been discovered that virtually eliminates the formation of undesirable by-products. The presence of nonfunctional or monofunctional materials in the prepolymers result in coatings with poor mechanical and surface properties. Consequently, these coatings have limited commercial value. Nonfunctional materials, mainly cyclic tetramers and trimers, are formed during the ring opening polymerization from chain "back-biting." Monofunctional materials, on the other hand, are formed due to counter-ion terminations, such as diethyl ether and fluoride ion terminations. The processes of this invention are unique in their lack of by-product production. Using the methods of the present invention, production of cyclic tetramers and monofunctional prepolymers are virtually eliminated.

B. MONOMERS

1. Preparation of Mono- and Bis-Substituted FOX Monomers

The mono- and bis-substituted fluorinated alkyloxy-3-methyloxetane monomers of this invention have the following general formula:

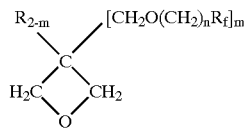

In the above formula, n is 1 to 3, m is 1 (for mono-substituted) or 2 (for bis-substituted), R is methyl or ethyl, and $R_f$ is a linear or branched chain fluorinated alkyl and isoalkyl having from 1 to 20 carbons, or an oxaperfluorinated polyether having from 4 to about 60 carbons.

The FOX monomers of this invention are obtained by reaction of aryl sulfonate derivatives of 3-hydroxymethyl-3-methyloxetanes (arylsulfonate-MO), 3,3-hydroxymethyloxetanes (arylsulfonate-BO) or the reaction of mono-substituted 3-haloalkyl-3-methyloxetanes or bis-substituted 3,3-(haloalkyl)oxetanes with fluorinated alkoxides in the presence of a polar aprotic solvent:

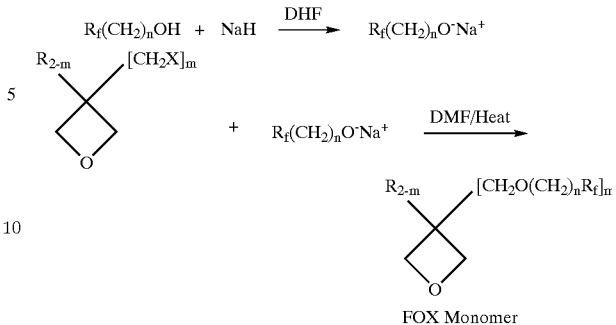

FOX Monomer

In the above formula, $R_f$ is linear or branched chain perfluorinated alkyl or isoalkyl having from 1 to 20 carbons, or an oxaperfluorinated polyether having from 4 to about 60 carbons; and X=Br, Cl, I or an aryl sulfonate. Examples of suitable $R_f$ groups include, but are not limited to, —$CF_3$, —$C_2F_5$, —$C_3F_7$ and —$C_7F_{15}$. It is noted that the numeric FOX designation is determined by the number of fluorine atoms in the terminal perfluoroalkyl group of the side chain.

The aryl sulfonate derivatives of the hydroxyalkyloxetanes have the general formula:

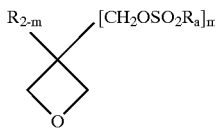

In the above formula, m is 1 (for mono-substituted) or 2 (for bis-substituted), $R_a$ is a monocyclic aryl having from $C_6$ to $C_{10}$ carbons, e.g., benzyl, tolyl, xylyl, mesityl or an alkyl, such as —$CH_3$ or —$CF_3$. The preferred sulfonates are toluene sulfonates, e.g., p-toluene sulfonate derivatives of 3-hydroxymethyl-3-methyloxetane (HMMO) or 3,3-hydroxymethyloxetane (BHMO).

The fluorinated alkoxides are obtained by the reaction of fluorinated alcohols with sodium hydride in a suitable solvent such as dimethylformamide:

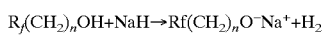

The fluorinated alcohols which can be used have the general formula:

In the above formula, n is 1 to 3; and $R_f$ is a linear or branched chain fluorinated alkyl or isoalkyl having from 1 to 20 carbons, or an oxaperfluorinated polyether having from 4 to about 60 carbons. Examples of suitable fluorinated alcohols include, but are not limited to, trifluoroethanol, heptafluorobutanol, pentadecafluorooctanol, tridecafluorooctanol, and the like. Other useful alcohols include fluorinated alcohols having the following formulas:

a) $HO(CH_2)_n(CF_2)_x$—F b) $HOCH_2CF_2(OCF_2CF_2)_x$—F c) 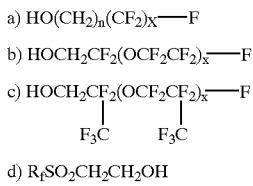

d) $R_fSO_2CH_2CH_2OH$

In the above formulae, n is 1 to about 3, and x is 1 to about 20.

Although sodium hydride is the preferred base for this reaction, other bases, such as potassium hydride, potassium t-butoxide, calcium hydride, sodium hydroxide, potassium hydroxide, $NaNH_2$, n-butyl lithium and lithium diisopropylamide, can also be used. Moreover, although the preferred solvent for the formation of the alkoxide from these alcohols is dimethylformamide (DMF), other solvents, such as dimethylacetamide, DMSO and hexamethylene phosphoramide (HMPA), can also be used.

The displacement reaction can be conducted at a temperature ranging from about 25° C. to about 150° C. and, more preferably, at a temperature ranging from about 75° C. to about 85° C. At lower temperatures, the rate of displacement is slowed down considerably and, thus, is only marginally useful for commercial scale-up. At higher temperatures, i.e., greater than 120° C., the rate of displacement is extremely fast. However, at these higher temperatures, other side reactions, such as hydrolysis reactions, dominate. Thus, the preferred reaction temperature is less than 120° C.

It is noted that mono-substituted FOX monomers can advantageously be derived from the premonomer 3-bromomethyl-3-methyloxetane ("BrMMO"). The preparation of BrMMO and the use of this premonomer to prepare mono-substituted FOX monomers are disclosed in U.S. Pat. No. 5,654,450, which issued to Malik, et al. on Aug. 5, 1997, the teachings of which are incorporated herein by reference.

2. Preferred Process for Synthesis of FOX Monomers

A preferred process for preparing FOX monomers in high yields has been discovered that eliminates the use of organic solvents and strong bases, such as NaH. The elimination of organic solvents reduces hazardous waste generation and air emissions of volatile organic compounds. The process steps are as follows:

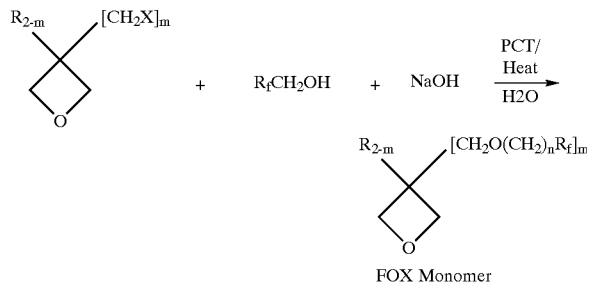

FOX Monomer

In the above reaction scheme, $R_f$ is a linear or branched chain perfluorinated alkyl or isoalkyl having from 1 to 20 carbons, or an oxaperfluorinated polyether having from 4 to about 60 carbons; and X=Br, Cl or I.

In this process, a mixture of 3-haloalkyl-3-methyloxetane (for mono-substituted FOX monomers) or 3,3-(haloalky) oxetane (for bis-substituted FOX monomers), fluoroalcohol, a base, such as sodium hydroxide or potassium hydroxide, and a phase transfer catalyst are heated in an aqueous medium at a temperature of about 80° to about 85° C. until GLC analysis reveals complete consumption of the starting materials. Upon completion of the reaction, the product is recovered by separation and distillation of the organic phase. The organic phase contains most of the FOX monomer. The recovered FOX monomer is polymer grade and has a purity normally in excess of 99%. Isolated yields are high and range from about 80% to about 90% for the purified FOX monomer. Yields prior to separation and purification exceed 90% for the crude product.

A variety of bases can be used in the above process. Examples of suitable bases include, but are not limited to, sodium hydroxide, potassium hydroxide, calcium hydroxide, magnesium hydroxide, tetrabutylammonium hydroxide, etc. In a presently preferred embodiment, sodium hydroxide and potassium hydroxide are used because they are readily available in large quantities and are relatively inexpensive.

Phase transfer catalysts function by transferring the counterion so that it is more soluble in the organic phase. A variety of phase transfer catalysts can be used in this process. Examples of suitable phase transfer catalysts include, but are not limited to, tetramethylammonium bromide, tetraethylammonium bromide, tetramethylammonium iodide, cetyltributylammonium bromide, crown ethers, glycols, and the like. In a preferred embodiment, tetrabutylammonium bromide is the phase transfer catalyst used due to its relatively low cost and good solubility in both organic and aqueous mediums.

The above reaction can be conducted at temperatures as low as 50° C. and as high as 120° C. However, at low temperatures, the rate of displacement is slowed and competing side reactions, such as hydrolysis, start to dominate. At higher temperatures, the rate of displacement is extremely fast, requiring specialized equipment that can handle pressure, thereby making the process uneconomical and unattractive for commercial scale-up.

C. PREPOLYMERS

The present invention provides the following types of prepolymers: homo-prepolymers where the prepolymer is assembled from only asymmetrically bis-substituted FOX monomer; coprepolymers where the prepolymer is assembled from a mixture of symmetrically bis-substituted FOX monomers and asymmetrically bis-substituted FOX monomers; coprepolymers where the prepolymer is assembled from a mixture of bis-substituted FOX monomers (either symmetrically, asymmetrically substituted or a mixture thereof) and mono-substituted FOX monomers (or a mixture thereof); coprepolymers where the prepolymer is assembled from a mixture of bis-substituted FOX monomers (either symmetrically, asymmetrically substituted or a mixture thereof) and tetrahydrofuran (THF); coprepolymers where the prepolymer is assembled from a mixture of bis-substituted FOX monomers (either symmetrically substituted, asymmetrically substituted or a mixture thereof) and mono-substituted FOX monomers (or a mixture thereof) and THF.

One of the main applications of the hydroxy-terminated FOX prepolymers is in the development of hydrophobic, nonstick, low friction materials. The most important criterion in preparation of these materials is the minimization of the surface energy, which is a measure of the wettability of the material and defines critical properties, such as its hydrophobicity and adhesive characteristics.

In order to prepare materials with low surface energies, it is critical that the fluoroalkyl groups be present in the side chain and that the terminal carbon of the fluoroalkyl groups be perfluorinated. The importance of having fluorine in the side chain, rather than in the polymer backbone, is demonstrated by comparing the surface energies of fluorinated polyacrylates and polytetrafluoroethylene (TEFLONTm). The surface energy of TEFLON™, which contains fluorine in the polymer backbone, is 18.5 ergs/cm². By comparison, the surface energy of polyfluoroacrylates, which contain fluorine in the side chains, is between 10–12 ergs/cm². Also, fluoroalkyl groups that contain hydrogen or halogen (ie., Cl, Br, I, etc.) on the terminal carbon have considerably higher surface energies than those with the —CF₃ groups. The dependence of surface energy on the surface constitution of typical organic materials is illustrated in Table 1.

TABLE 1

SURFACE ENERGIES OF ORGANIC MATERIALS

| SURFACE CONSTITUTION | ERGS/CM² @ 20° C. |
|---|---|
| —CF₃ Close Packed | 6 |
| —CF₂H | 15 |
| —CF₂— | 18 |
| —CH₃ | 22 |
| —CH₂— | 31 |
| —CH₂CHCl— | 39 |
| Polyester | 43 |

It has now been discovered that placing the fluorine in the side chain, rather than on the backbone as in TEFLON™, improves surface lubricity, and the resulting prepolymer/elastomer exhibits a surface energy lower than a polymer having fluorine just in the backbone. There is, however, a trade-off between having the fluorine on the side chain and having the fluorine on the backbone. More particularly, while an increase in lubricity in achieved by incorporating a fluorinated side chain, there is a reduction in thermal stability as compared to a polymer having fluorine only on the backbone, e.g., as in TEFLON™.

1. Hydroxy-Terminated FOX Homo- and Coprepolymers

As discussed above, the present invention provides the following types of hydroxy-terminated FOX homo- and coprepolymers: homoprepolymers where the prepolymer is assembled from only asymmetrically bis-substituted FOX monomer; coprepolymers where the prepolymer is assembled from a mixture of symmetrically bis-substituted FOX monomers and asymmetrically bis-substituted FOX monomers; and coprepolymers where the prepolymer is assembled from a mixture of bis-substituted FOX monomers (either symmetrically, asymmetrically substituted or a mixture thereof) and mono-substituted FOX monomers (or a mixture thereof). As such, in one embodiment, the prepolymers comprise a monomeric unit having the following general formula:

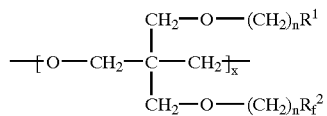

In the above formula, each n is independently selected and is 1 to 3; $R_f^1$ and $R_f^2$ are independently selected from the group consisting of linear perfluorinated alkyls, linear perfluorinated isoalkyls, branched chain perfluorinated alkyols, branched perfluorinated isoalkyls, the perfluorinated alkyls and isoalkyls having from 1 to about 20 carbon atoms, and oxaperfluorinated polyethers having from 4 to about 60 carbon atoms; and x is 1 to about 250 and, more preferably, 2 to about 100. It is noted that $R_f^1$ and $R_f^2$ are selected so that they are different.

In another embodiment, the prepolymers comprise a mixture of monomeric units have the following general formulae:

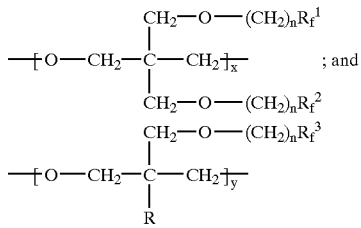

In the above formula, each n is independently selected and is 1 to 3; R is selected from the group consisting of methyl and ethyl; and $R_f^1$, $R_f^2$ and $R_f^3$ are independently selected from the group consisting of linear fluorinated alkyls, linear fluorinated isoalkyls, branched chain fluorinated alkyls, branched fluorinated isoalkyls, the fluorinated alkyls and isoalkyls having from 1 to 20 carbon atoms, and oxaperfluorinated polyethers having from 4 to about 60 carbon atoms; x is 1 to about 250 and, more preferably, 2 to about 100; and y is 1 to about 250 and, more preferably, 2 to about 100.

In addition to providing hydroxy-terminated FOX homo- and coprepolymers, the present invention provides a method of making the FOX homo- and coprepolymers. Generally, the method of making the FOX homo- and coprepolymers includes the steps of:

1) charging a reactor with a catalyst, an initiator and a solvent;
2) adding a solution of FOX monomer(s) in an appropriate organic solvent at a temperature between −20° C. and +60° C.;
3) reacting the FOX monomer(s) with the catalyst/initiator solution;
4) quenching the reaction; and
5) separating the FOX prepolymer by precipitation in methanol.

The polymerization reaction can be a homopolymerization reaction or a co-polymerization reaction in which a mixture of two or more of the above-mentioned oxetane monomers is added to the polymerization zone. A particularly useful co-polymerization is a block polymerization in which the comonomers are sequentially added in selected proportions to obtain block copolymers of controlled block sizes and properties.

In accordance with the present invention, solution polymerization can be conducted at a solids concentration of about 5% to about 85% and, more preferably, at a solids concentration of about 50 to about 60% solids. The polymerization reaction is conducted in the presence of a suitable inert solvent and, preferably, a halogenated $C_1$ to $C_5$ hydrocarbon. Examples of suitable solvents include, but are not limited to, methylene chloride, carbon tetrachloride, chloroform, trichloroethylene, chlorobenzene, ethyl bromide, dichloroethane, fluorinated solvents, etc. In a preferred embodiment, methylene chloride or a mixture of methylene chloride and Freon™ is employed. Other solvents, such as sulfur dioxide, hexanes, petroleum ether, toluene, dioxane and xylene, can also be used.

The FOX monomers readily polymerize in the presence of a Lewis acid catalyst, i.e., a compounds capable of accepting a pair of electrons, and a polymerization initiator. Suitable Lewis acid catalysts include, but are not limited to, complexes of boron trifluoride, phosphorus pentafluoride, antimony pentafluoride, zinc chloride, aluminum bromide, and the like. In a preferred embodiment, the Lewis acid catalyst is boron trifluoride tetrahydrofuranate, i.e., a $BF_3$.THF complex. The polymerization initiator is preferably a polyhydroxy aliphatic compound. Examples of suitable polymerization initiators include, but are not limited to, alkyl and isoalkyl polyols having from about 2 to about 5 carbon atoms and from about 2 to about 4 hydroxyls. Such compounds include, for instance, ethylene glycol, butane-1,4-diol, propylene glycol, isobutane-1,3-diol, pentane-1,5-diol, pentaerythritol, trimethylolpropane, and the like. In a presently preferred embodiment, butane-1,4-diol is the polymerization initiator used.

The catalyst and initiator are preferably mixed for about 5 to about 10 minutes in the solvent prior to the addition of the FOX monomers. The ratio of catalyst to initiator can range from about 1:1 to about 1:5 mol/mol and, more preferably, from about 1:1 to about 1:2 mol/mol. An example of a preferred catalyst, initiator and solvent system is $BF_3$.THF, butane-1,4-diol and methylene chloride. The ratio of the monomer to the catalyst ranges from about 5:1 mol/mol to about 300:1 mol/mol and, more preferably, from about 10:1 mol/mol to about 50:1 mol/mol.

In a typical example, the catalyst and the initiator are mixed in a solvent prior to the addition of the FOX monomer(s). As oxetane monomers possess relatively high strain energy and undergo exothermic, ring-opening polymerizations, the FOX monomer(s) is added slowly over a period of time to control the reaction temperature and to avoid run-away reactions. The progress of the reaction is monitored by $^1H$ NMR and when greater than about 95% of the FOX monomer is consumed, the reaction is quenched with water. The prepolymer is purified, for example, by precipitation in methanol.

The molecular weight of the prepolymer can be controlled by varying the monomer/initiator ratio. Generally, lower monomer/initiator ratios favor the formation of lower molecular weight prepolymers. The ratio of monomer to initiator can range from about 5:1 mol/mol to about 300:1 mol/mol, more preferably, from about 10:1 mol/mol to about 100:1 mol/mol and, more preferably, from about 5:1 mol/mol.

The reaction temperature can be varied from about $-20°$ to about $+60°$ C. In a preferred embodiment, the reaction temperature is about $+5°$ C. At higher temperatures, formation of monofunctional materials, mainly $—CH_2F$ terminated materials, is observed. Monofunctional materials can act as chain terminators, thereby limiting the molecular weight of the final polymer as well as increasing the polydispersity. This, in turn, can result in polymers having poor mechanical and physical properties.

Cyclic oligomers are normally formed as by-products in the synthesis of polyether prepolymers. Such materials are nonfunctional and, thus, reduce the usefulness of the prepolymers. Moreover, these materials can leach out of the polymer matrix, thereby drastically affecting the surface and mechanical properties of the polymer. Prepolymers prepared by homopolymerization of FOX monomers contain approximately 2–7% cyclic tetramer.

However, the formation of cyclic oligomers can be controlled somewhat by the choice of catalyst employed. For instance, the $BF_3$.etherate catalyst results in about 10% to 15% of monofunctional material and about 6% to 7% cyclic tetramer by-product. In contrast, $BF_3$.THF, the preferred catalyst used in the methods of the present invention, results in less than 7% of the cyclic tetramer byproduct and eliminates the formation of the monofunctional materials. In turn, this increases the functionality of the prepolymer and leads to polymers having excellent mechanical, surface, and physical properties.

The polymerization of FOX monomers occurs by cationic ring-opening reaction, a possible mechanism for which is presented in FIG. 1. Polymerization is initiated by the proton donated by the initiator, and the protonated oxetane ring undergoes propagation with other oxetanes to generate the polymer chain. The growing polymer chain is then terminated with either an alcohol or water to give the hydroxy-terminated polyether prepolymers of this invention. It should be noted that the prepolymers of this invention are mixtures of prepolymers resulting from both alcohol and water terminations.

The prepolymers of this invention are amorphous, low-viscosity oils that are easy to process. The inherent viscosity of the prepolymers are between 0.05 and 0.08 dL/g. The number of average molecular weights of the prepolymers, as determined by gel permeation chromatography, are between 1,000 and 30,000. The polydispersity, a measure of the spread or "Q" of the molecular distribution, is very low, i.e., on the order of less than 5 and typically between 1.1–2.0. The prepolymers exhibit unimodal molecular weight distribution, and typically contain only about 2–7% cyclic tetramer.

It should be noted that molecular weights reported in this invention are expressed relative to well-characterized polystyrene standards. The equivalent weight of the prepolymers was determined by $^1H$ NMR employing TFAA end group analysis and were between 2,500 and 9,000. The glass transition temperature ($T_g$) of the prepolymers, as determined by DSC analysis, was between $-38°$ C. and $-45°$ C.

The structural analysis of the homo- and coprepolymers of this invention was conducted with $^1H$, $^{13}C$ and $^{19}F$ NMR spectroscopy. $^1H$ NMR analysis revealed the presence of a trimethyleneoxide-based polyether backbone. $^1H$ NMR analysis also indicated that when $BF_3$.etherate is used as the catalyst, substantial amounts of mono-functional material with $—CH_2F$ and $—OCH_2CH_3$ end-groups is formed. However, when $BF_3$.THF is used as the catalyst, formation of mono-functional material is not observed. $^1H$ NMR was also used to establish the ratio of the monomers in the coprepolymer and the identity of the end groups. $^{19}F$ NMR analysis confirmed the presence of fluoroalkyl side chains and the absence of materials with $—CH_2F$ end groups and other impurities, such as Freon, HF and the $BF_3$ catalyst.

The prepolymers of the present invention are oils that can be used as lubricants or as additives for a variety of applications. For example, these materials can be used as additives in cosmetics to impart water repellency and release characteristics. In addition, these materials can be used as additives in engine oils to reduce engine wear and improve performance. The principal application, however, is in the preparation of fluorinated polymers which, in turn, can be used for diverse applications ranging from car wax to materials for medical and dental applications, such as prosthetics and catheter linings.

2. Hydroxy-Terminated FOX/THF Coprepolymers

In another embodiment, the present invention provides hydroxy-terminated FOX/THF coprepolymers. It has been discovered that the fluorinated oxetanes of this invention can be copolymerized with THF to provide a FOX/THF coprepolymer having very unique and unexpected characteristics. Such coprepolymers are a new class of fluorine containing, hydroxy-terminated, polyether prepolymers that, when cured with polyisocyanates, provide tough polyurethane elastomers that are characterized by low glass transition temperatures and low surface energies. Moreover, these elastomers can be incorporated into coatings that exhibit high abrasion resistance and a low coefficient of friction. Combinations of these properties make the polymers derived from these fluorinated coprepolymers extremely attractive for a variety of applications including, but not limited to, anti-fouling (i.e., release) coatings; ice release coatings; corrosion resistant coatings, automotive top coats (e.g., car wax), windshield wipers; belt strips; various household goods; seals and gaskets; encapsulants for electronic devices; oil and dirt resistance coatings; and numerous medical/dental applications.

Tetrahydrofuran (THF) is a five-membered cyclic ether that is commercially available and is known to polymerize or copolymerize with cationic catalysts, but not with anionic catalysts. Attempts to copolymerize THF with cyclic ethers and, in particular, oxetanes are unpredictable. Polymerization occurs, but the products are often not random copolymers. Due to the vast differences in ring-opening polymerizability between THF and oxetanes, it is more likely that the product is a block copolymer, rather than a random copolymer. Poly(THF) (PTHF) is a semicrystalline polymer that melts at about 50° C., and when employed as the soft segment in urethane elastomers, is likely to crystallize at low temperatures, thereby causing problems with physical properties, such as poor flexibility, incomplete or little recovery after elongation, poor modulus, and the like. In a block or nonrandom copolymer, similar problems can occur since THF blocks can crystallize and form semicrystalline polymers.

In the FOX/THF random coprepolymer of this invention, THF and oxetane segments are more or less randomly spaced along the polymer backbone, thereby leading to products that are amorphous oils. The more or less random nature of the FOX/THF coprepolymers of the present invention prevents backbone tacticity or any other form of regularity that lends itself to ordering and, in turn, crystallinity. Hydroxy-terminated polyether prepolymers that are low in crystallinity, preferably amorphous, are particularly suitable as the soft segments for urethane elastomers.

In this invention, the FOX monomers (either bis-substituted or a mixture of bis- and mono-substituted FOX monomers) can be copolymerized with tetrahydrofuran to give FOX/THF coprepolymers. Copolymerization of FOX monomers with THF not only reduces the cost of fluorinated prepolymers by using less of the relatively more expensive FOX monomers, but also provides prepolymers with superior properties. The coprepolymers of this invention are random copolymers and are ideal as soft segments for urethane elastomers. Moreover, these FOX/THF coprepolymers are amorphous oils that are easy to process. Also, the use of THF as a coreactant allows the polymerization to be conducted in bulk and eliminates the use of ozone depleting solvents, such as Freons™.

In one embodiment, the FOX/THF coprepolymer comprises a mixture of monomeric units having the following general formulae:

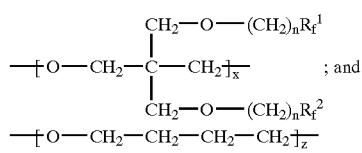
; and

In the above formula, n is independently selected and is 1 to 3; $R_f^1$ and $R_f^2$ are independently selected from the group consisting of linear perfluorinated alkyl groups having 1–20 carbons, branched perfluorinated alkyl groups having 1–20 carbons and oxaperfluorinated polyethers having from about 4–60 carbons; x is 1 to about 250 and, more preferably, 2 to about 100; and z is 1 to about 250 and, more preferably, 1 to about 100. Typically, the molecular weight ($M_n$) of the FOX/THF coprepolymers ranges from about 2,000 to about 50,000 and, more preferably, from about 2,000 to about 15,000; and the $T_g$ is less than about –200.

In another embodiment, the FOX/THF coprepolymers of the present invention comprise a mixture of monomeric units having the following general formulae:

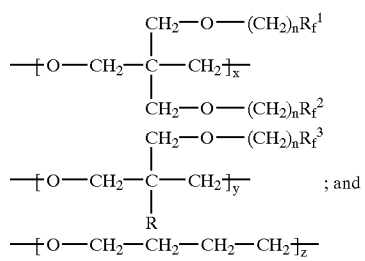

In the above formula, each n is independently selected and is 1 to 3; R is selected from the group consisting of methyl and ethyl; $R_f^1$, $R_f^2$ and $R_f^3$ are independently selected from the group consisting of linear perfluorinated alkyl groups having 1–20 carbons, branched perfluorinated alkyl groups having 1–20 carbons and oxaperfluorinated polyethers having from about 4–60 carbons; x is 1 to about 250 and, more preferably, 2 to about 100; y is about 1 to about 250 and, more preferably, 2 to about 100; and z is 1 to about 250 and, more preferably, 1 to about 100. Typically, the molecular weight ($M_n$) of the FOX/THF coprepolymers ranges from about 2,000 to about 50,000 and, more preferably, from about 2,000 to about 15,000; and the $T_g$ is less than about –20° C.

Unexpectedly, the resulting coprepolymers of this invention are more or less random. The more or less random sequence of the coprepolymers, together with the presence of the asymmetric FOX segment, results in a low-viscosity oil that significantly facilitates processing and the commercial application of the product. Moreover, the surface energy of the FOX/THF coprepolymers, as cured polymers, is lower than that of polytetrafluoroethylene (TEFLON™). This lower surface energy is thought to be due to the presence of the fluorine in the side chains of the polymer, rather than in the backbone of the polymer. Even though the amount of fluorine in the FOX/THF coprepolymer has been reduced by the introduction of the THF segments, it has thus far been determined that when the FOX/THF copolymer contains up to about 65% THF, no significant reduction in surface energy is observed in polyurethane elastomers as compared to the elastomers prepared from the mono-substituted FOX monomers.

The random nature of the coprepolymer sequence is wholly unexpected and is achieved with the novel reaction conditions outlined below. The more or less randomness results in an amorphous, low-viscosity oil. The benefits of a liquid prepolymer over a crystalline prepolymer include, for example, easier processing and mixing with reactants (e.g., diisocyantes, crosslinkers, chain extenders, etc.).

As such, in another embodiment, the present invention provides a semi-batch method of making FOX/THF coprepolymers. Generally, the method of making the FOX/THF coprepolymers of the present invention includes the following steps:

1) premixing THF in an appropriate organic solvent, the THF and solvent temperature being between about −20° C. and about +60° C.;
2) adding a catalyst;
3) adding an initiator;
4) adding at a controlled rate a FOX monomer(s), the temperature of the FOX monomer(s) being between about −20° C. and about +60° C.;
5) quenching the reaction; and
6) separating the FOX/THF prepolymer by precipitation in methanol.

Importantly, when the copolymer ratio of FOX to THF ranges from about 60:40 mol/mol to about 35:65 mol/mol, no organic solvent is required and the prepolymer can be made by the addition of FOX to neat THF. The absence of solvent offers significant advantages to manufacturers with respect to the environmental costs associated with the storage, handling and disposal of hazardous materials, as well as the lower manufacturing costs and enhanced public perception (i.e., a "green" product). Further, the presence of the hydrocarbon segment, i.e., the THF segment, improves solubility of the FOX/THF coprepolymers in hydrocarbons.

Solution polymerization can be conducted at a solids concentration ranging from about 5% to about 85% and, more preferably, from about 50% to about 60% solids. The copolymerization is conducted either in an inert solvent, such as methylene chloride, Freon™ 113 or mixtures thereof, or in neat THF. Other solvents suitable for use in this process include, but are not limited to, carbon tetrachloride, chloroform, trichloroethylene, chlorobenzene, ethyl bromide, dichloroethane, fluorinated solvents, sulfur dioxide, hexanes, petroleum ether, toluene, trifluorotoluene, trifluorochlorotoluene, dioxane, xylene, etc. In a preferred embodiment, the solvent is methylene chloride or a mixture of methylene chloride and Freon™. The fact that FOX/THF copolymers can be prepared in the absence of a solvent is beneficial in the view of full-scale production, since environmental regulations highly restrict the emission of solvents, especially halogenated solvents, into the atmosphere.

The catalyst and the initiator are similar to those used in the homo- or co-polymerization of FOX monomers. Suitable catalysts are Lewis acids, i.e., compounds capable of accepting a pair of electrons. Examples of Lewis acids include, but are not limited to, complexes of boron trifluoride, phosphorous pentafluoride, $SnCl_4$, antimony pentafluoride, etc. Suitable initiators include water and aliphatic alcohols containing 2 to 5 carbons and 1 to 4 hydroxy groups. Suitable aliphatic alcohols include, but are not limited to, trifluoroethanol, methanol, 1,4-butanediol, trimethylolpropane, pentaerythritol, etc.

In a typical example, the catalyst and the initiator are mixed in a solvent prior to the addition of the monomer. THF is a five-membered cyclic ether with low strain energy, and does not readily homopolymerize under the reaction conditions of temperature and monomer concentration employed. Thus, THF can be added in one shot to the reaction mixture. On the other hand, oxetane monomers possess relatively high strain energy and undergo exothermic, ring-opening polymerizations. Thus, the FOX monomers are added slowly over a period of time to control the reaction temperature and to avoid run-away reactions. The progress of the reaction is monitored by $^1H$ NMR and when greater than 95% of FOX monomer is consumed, the reaction is quenched with water. The prepolymer is purified, for example, by precipitation in methanol.

As previously described, the molecular weight of the FOX/THF coprepolymers can be controlled by varying the monomer/initiator ratio. Generally, lower monomer/initiator ratios favor the formation of lower molecular weight coprepolymers. The ratio of monomer to initiator can range from about 5:1 mol/mol to 300:1 mol/mol. In a presently preferred embodiment, the ratio of monomer to initiator employed is about 5:1 mol/mol to 100:1 mol/mol. The temperature can range from about −20° C. to +60° C., with the presently preferred temperature being about +5° C. At higher temperatures, formation of monofunctional materials, mainly —$CH_2F$ terminated materials, is observed. If the reaction is carried out at about +5° C., the formation of —$CH_2F$ terminal groups, which are unreactive and reduce the functionality of the prepolymer (by formation of the monofunctional product) and lead to polyurethanes with poor mechanical properties, is eliminated.

In contrast to the FOX homo- and co-prepolymers, the formation of large amounts of cyclic oligomers is not observed in the copolymerization of FOX monomers with greater than 10 mole % THF. It is postulated that the incorporation of THF into the growing polymer chain changes the number of carbon atoms between oxygen atoms in the polymer chain and does not allow the chain to bite back and form a thermodynamically stable, 16-membered cyclic ether. This result is especially important in the development of coatings, where discharge of any chemicals from candidate coatings is not acceptable.

The FOX/THF coprepolymers of this invention are amorphous, low-viscosity oils that are easy to process. FOX/THF coprepolymers are slightly more viscous than FOX homoprepolymers. $^1H$ NMR analysis of FOX/THF coprepolymers indicates that both monomers are incorporated into the coprepolymer, and that the THF segment is primarily present in the middle of two FOX segments, and not as an end group.

The ratio of the two monomers in the coprepolymer is established by comparing the area under the peaks corresponding to THF (about 1.6 ppm) and the FOX monomers segments. $^1H$ NMR analysis also indicates that FOX/THF copolymers are not contaminated with monofunctional materials (—$CH_2F$ terminated) or other impurities. The presence of multiple peaks in the quartenary carbon region of $^{13}C$ NMR, corresponding to the carbon bearing the fluoroalkyl side chain, reveals that the above prepolymers are nearly random copolymers with little, if any, block structure. $^{19}F$ NMR analysis confirms the presence of the fluoroalkyl side chain and the absence of —$CH_2F$ end groups, HF and $BF_3$ catalyst. It is important to note that these materials do not contain THF block sequences long enough to crystallize, which could lead to materials with poor flexibility.

The number of average molecular weights of FOX/THF coprepolymers, as determined by GPC, were between 10,000 and 14,000, whereas $M_w/M_n$ were between 1.1 and 2.5. The coprepolymers exhibit unimodal molecular weight distributions, and are typically free of cyclic oligomers. It should be noted that the formation of a random copolymer between bis-substituted FOX monomers and THF monomers is unexpected.

The coprepolymers described above are oils that can be used as lubricants or as additives for a variety of applications. For example, the coprepolymers can be used as additives to improve the performance of commercial engine oils or as lubricants for industrial equipment. The major use of FOX/THF coprepolymers, however, is in the development of fluorinated polyether urethane elastomers as described herein.

D. POLYMERS

The hydroxy-terminated prepolymers of this invention can be used for the synthesis of a variety of polymers, such as polyurethanes, polyesters, polycarbonates, polyacrylates, etc. In addition, the FOX prepolymers of this invention can be used to synthesize novel fluorinated elastomers, thermosets and thermoplastics.

1. Polyurethanes from FOX Homo-/Coprepolymers

The preparation of fluorinated polyurethane elastomers begins with the FOX prepolymers of this invention. As previously described, these prepolymers are amorphous, low-viscosity oils that are easy to process. Moreover, these materials are difunctional and possess terminal primary hydroxy groups that react readily with isocyanates to form high molecular weight polyurethane elastomers. Typically, the prepolymer is reacted with an equivalent amount of a polyisocyanate in the presence of a catalyst and a crosslinking agent to form a three-dimensional, polymer network. The process involves mixing the components, casting them in a mold, degassing and curing the mixture at an elevated temperature. Alternatively, the FOX prepolymer is reacted with excess diisocyanate and the resulting isocyanate-capped prepolymer is reacted with a crosslinking agent to form a thermoset. If desired, the isocyanate-capped prepolymer can be reacted with a low molecular weight diol or diamine, i.e., a chain extender, to form a linear, thermoplastic polyurethane elastomer.

In one embodiment, the fluorine-containing thermoplastic polyurethane elastomer of this invention comprises a mixture of monomeric units having the following general formulae:

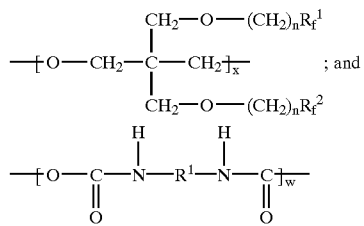

In the above formula, n is independently selected and is 1 to 3; $R_f^1$ and $R_f^2$ are independently selected from the group consisting of linear and branched perfluorinated alkyls having 1–20 carbon atoms, and oxaperfluorinated polyethers having from about 4–20 carbon atoms; $R^1$ is a divalent hydrocarbyl radical; x is 1 to about 250 and, more preferably, 2 to about 100; and w is 1 to about 50 and, more preferably, 1 to about 5. It is noted that $R_f^1$ and $R_f^2$ are selected such that they are different. Examples of suitable divalent hydrocarbyl radicals include, but are not limited to, the following structures:

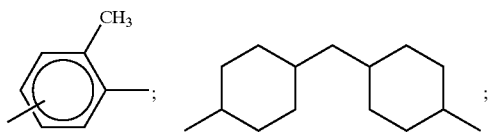

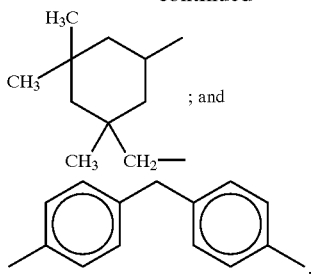

In another embodiment, the fluorine-containing thermoplastic polyurethane elastomer of this invention comprises a mixture of monomeric units having the following general formulae:

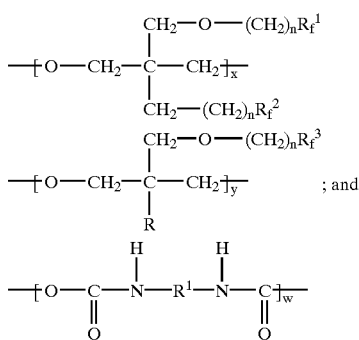

In the above formula, n is independently selected and is 1 to 3; R is selected from the group consisting of methyl and ethyl; $R_f^1$, $R_f^2$ and $R_f^3$ are independently selected from the group consisting of linear and branched perfluorinated alkyls having 1–20 carbon atoms, and oxaperfluorinated polyethers having from about 4–20 carbon atoms; $R^1$ is a divalent hydrocarbyl radical; x is 1 to about 250 and, more preferably, 2 to about 100; y is 1 to about 250 and, more preferably, 2 to about 100; and w is 1 to about 50 and, more preferably, 1 to about 5.

The resulting polyurethanes are tack-free, opaque and generally insoluble in organic solvents and have glass transition temperatures between about −40° C. and about −47° C. Contact angle measurements of between 110° and 145° with distilled water and surface energy measurements of 13.8–15.2 ergs/cm² indicate that the surface wettability and nonadhesive characteristics of the elastomers of this invention are greater than those measured for TEFLON™ (110° contact angle and 18.5 ergs/cm² surface energy). It has generally been found that as the size of the side chain on the FOX polymers increases, hydrophobicity increases as well.

The polyurethanes of this invention exhibit the following novel set of characteristics:

1) Elastomeric properties;
2) More hydrophobic and nonstick than TEFLON™;
3) Processable into thin coatings or bulk articles;
4) Flexible down to about −50° C.;
5) Bondable to a variety of substrates; and
6) Useful ambient temperature range from about −50° C. to about 240° C.

The glass transition temperature ($T_g$) is the temperature at which the polymer is transformed from a brittle glass to a flexible elastomer. Thus, it dictates the lower use temperature of the elastomer. The glass transition temperatures of non-plasticized FOX polyurethanes, as measured with a differential scanning calorimeter (DSC), are between −40° C. and −47° C. Normally, a plasticizer is used to impart flexibility and to lower the glass transition temperature of the polymers. If desired, fluorinated plasticizers, such as Fomblin, Alfunox and Kel-F oils, can be used to improve the low-temperature flexibility of the FOX polyurethane elastomers of the present invention.

The contact angle is the obtuse angle of a water droplet on the polymer surface and reflects the wettability of the polymer surface. A water droplet does not spread on a hydrophobic surface and will exhibit a high contact angle, indicating non-wetting characteristics of the polymer surface. The static contact angle of FOX polyurethanes with doubly distilled water were measured with a Goniometer, and were found to be between 110° and 145°. In sharp contrast, TEFLON™ exhibits a contact angle of 110°. Surface energy is also an important measure of wettability of the polymer surface and defines critical properties, such as hydrophobicity and adhesive characteristics. Materials with low surface energies are difficult to wet and, thus, exhibit excellent release characteristics. TEFLON™, for example, exhibits a surface energy of 18.5 ergs/cm$^2$, and is widely used in the preparation of nonstick cooking utensils. Surface energies of common polymers are listed in Table 2. The surface energy values of the polymers of the present invention are considerably lower than that of TEFLON™ and other commercial polymers, indicating that FOX polyurethanes have superior release characteristics to TEFLON™. This makes the cured elastomer of the present invention more suited than TEFLON™ for those applications where lower wettability and enhanced release characteristics are desired in a coating material.

TABLE 2

SURFACE ENERGIES OF COMMERCIAL POLYMERS

| Material | SURFACE (ergs/cm$^2$) |
| --- | --- |
| TEFLON ™ | 18.5 |
| Polydimethylsiloxanes | 24 |
| Polyethylene | 31 |
| Polytrichlorofluoroethylene | 31 |
| Polystyrene | 33–35 |
| Poly(methylmethacrylate) | 33–34 |
| Nylon 66 | 46 |

In another embodiment, the present invention provides methods for making the polyurethane elastomers of the present invention. In one embodiment, the method includes the steps of:

1) premixing a FOX prepolymer with a polyisocyanate at a temperature between about 25° C. and about 100° C.;
2) adding a catalyst;
3) adding from about 0% to about 15% wt/wt of a crosslinking agent;
4) mixing the components;
5) casting the components into a mold;
6) degassing the cast compound; and
7) curing the compound mixture at a temperature of between about 17° C. and about 150° C.

Normally, molar equivalent amounts of the FOX prepolymer, polyisocyanate and crosslinking agent are used. However, where the FOX prepolymer is added to an excess of polyisocyanate, an isocyanate-capped prepolymer is produced that can be further reacted with a crosslinking agent to produce a thermoset polyurethane elastomer. Alternatively, the isocyanate-capped prepolymer can be reacted with a low molecular weight chain extender, such as a diol or diamine, to prepare linear thermoplastic polyurethane elastomers.

Polyisocyanates suitable for use in the synthesis of the FOX polyurethanes of the present invention include, but are not limited to, hexamethylene diisocyanate (HDI), isopherone diisocyanate (IPDI), methylene diphenylisocyanate (MDI), saturated MDI (Des-W), polymeric MDI, which are available from Dow Chemical Co. under the trademark ISONATE, a line of low-functionality isocyanates, toulene diisocyanate (TDI), polymeric HDI, which are available from Mobay Corporation, a Bayer Company, under the trademarks DESMODUR N-100, a solvent-free, aliphatic polyisocyanate resin basin based on hexamethylene diisocyanate, and DESMODUR N-3200, an aliphatic polyisocyanate resin based on hexamethylene diisocyanate, cyclohexylene-1,4-diisocyanate, and 2,2,4-trimethylhexmethylene diisocyanate. The NCO:OH ratio can range from about 1.1 to about 0.9 and, more preferably, NCO:OH ratio is about 1.02.

The crosslinking agents normally used are low molecular weight polyols or polyamines. Examples of suitable crosslinking agents include, but are not limited to, trimethylolpropane, pentaerythritol, ISONOL® 93, trimethylolethane, triethanolamine, Jeffamines, 1,4-butanediamine, xylene diamine, diethylenetriamine, methylene dianiline, diethanolamine, etc. In preferred embodiments, trimethylolpropane, ISONOL® 93, methylene dianiline and Jeffamines are the crosslinking agents employed. The mechanical properties of the elastomers can be altered by varying the amount of crosslinking agent. Generally, increasing the amount of crosslinking agent in a polyurethane formulation leads to materials with higher modulus and improved chemical and abrasion resistance. The amount of crosslinking agent can be varied from about 0 to about 15% by weight and, more preferably, from about 1.5% to about 5% by weight.

Catalysts suitable for use in the present invention include, but are not limited to, triethylamine, triethylene diamine, triphenyl bismuth, chromium acetylacetonate, lead octonate, ferric acetylacetonate, tin octanoate, dibutyltin dilaurate, and the like. In a preferred embodiment, the catalyst is dibutyltin dilaurate. It should be noted that the catalyst is added primarily to increase the rate of the reaction and, if desired, the reaction can be conducted in the absence of the catalyst. The catalyst concentration can range from about 0.001 to about 1% by wt. and, more preferably, from about 0.1% and 0.2% by wt.

Bulk materials are prepared by casting the above formulation in a mold, degassing the mixture, and then curing the mixture at a temperature ranging from about 20° C. to about 150° C. for about 3 to about 36 hours. In a presently preferred embodiment, the cure temperature is about 65° C. It is noted that the above formulation can be cured at room temperature by increasing the amount of catalyst to about 0.5%. The cure is also dependent on the thickness of the sample and the type of crosslinking agent employed. Thin samples cure within about 3 hours at 65° C., whereas ⅛ inch thick sample can take between about 8 to about 16 hours to cure. A thin-film is prepared by diluting the above formulation with THF, spreading the mixture over the substrate with, for example, a Doctor's blade, and then curing the coated substrate in an oven at 65° C. Alternatively, the substrate can be dip coated or spray coated and cured in an oven at 65° C. In addition, amine-based crosslinking agents promote faster cures than polyols.

The mechanical properties of the polyurethanes prepared from FOX prepolymers indicate that they are true elastomers (i.e., >100% recoverable elongation). Moreover, the FOX polyurethanes of the present invention exhibit surprisingly good adhesion to a variety of substrates including, but not limited to, stainless steel, aluminum, graphite, EPDM rubber, glass and wood. In a typical process, the substrate is coated with the polyurethane formulation, placed in an oven, and cured. It is noted that no special treatment or primer is required to bond fluorinated polyurethane to the substrate. The good bonding characteristics of the FOX polyurethanes of the present invention are attributed to the presence of the polar urethane groups in the polymer backbone that, in contrast to fluoroalkyl groups, orient towards the high energy surface. A well-adhering coating should, therefore, contain chemical groups that will contribute to enhance the polarity of the coating and bring it into the range of the substrate. A system containing both dipole-dipole and hydrogen-bond contributions is preferred over a system containing only one such contribution because of its broader compatibility. During application, the system must be sufficiently fluid in order to encourage rapid spreading, uniform coating and good wetting. Since TEFLON™ has the fluorines symmetrically bonded to the polymer backbone, there is no dipole or hydrogen bonding which will allow the polymer to bond to a substrate surface. Consequently, a TEFLON™ coating will not exhibit good adhesion or peel strength with its underlying substrate.

The thermal stability of the FOX polyurethanes is determined by thermogravimetric analysis (TGA). The FOX polyurethanes of the present invention exhibit 0% wt. loss in air to 260° C., and an onset of major thermal degradation in air at 275° C. As such, the FOX polyurethanes should not be exposed to temperatures in excess of 250° C.

The above results indicate that the polyurethanes prepared from the FOX prepolymers of the present invention are more hydrophobic and nonstick than TEFLON™. In sharp contrast to TEFLON™, FOX polyurethanes are tough elastomers that can be processed into either thin coatings or bulk articles. Moreover, these materials are flexible at low temperatures and can be used at temperatures as low as −50° C. Also, these materials can be bonded to a variety of substrates, and can be used at temperatures ranging from about −50° C. to about 250° C. As such, this invention provides novel materials that can be bonded strongly to a variety of substrates and, at the same time, provide a surface that is more hydrophobic and nonstick than TEFLON™. Materials having this combination of properties are extremely useful as processable, low-surface-energy elastomers.

2. Polyurethanes from FOX/THF Coprepolymers

The FOX/THF coprepolymers of the present invention can also be used to produce polyurethane elastomers having useful properties. Polyurethanes prepared from FOX/THF coprepolymers exhibit better adhesion, higher abrasion resistance and superior mechanical properties than those derived from FOX homo- or coprepolymers. Moreover, the key properties of FOX polyurethanes are not affected by incorporation of THF into the polymer structure. That is, polyurethanes prepared from FOX/THF coprepolymers still exhibit low glass transition temperatures, low coefficients of friction, and low-surface-energy properties that are similar to those of polyurethanes derived from FOX homo- or coprepolymers.

As such, in one embodiment, the present invention a fluorinated thermoset polyurethane elastomer having random FOX/THF segments and comprising a mixture of monomeric units having the general formulae:

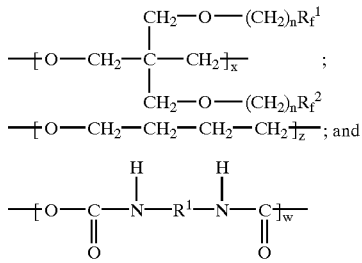

In the above formula, n is independently selected and is 1 to 3; $R_f^1$ and $R_f^2$ are independently selected from the group consisting of linear and branched perfluorinated alkyls having 1–20 carbon atoms, and oxaperfluorinated polyethers having from about 4–20 carbon atoms; $R^1$ is a divalent hydrocarbyl radical; x is 1 to about 250 and, more preferably, 2 to about 100; z is 1 to about 250 and, more preferably, 1 to about 100; and w is 1 to about 50 and, more preferably, 1 to about 5.

In another embodiment, the present invention provides a fluorinated thermoset polyurethane elastomer comprising a mixture of monomeric units having the general formulae:

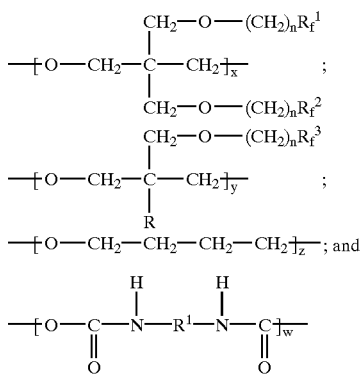

In the above formula, n is independently selected and is 1 to 3; R is selected from the group consisting of methyl and ethyl; $R_f^1$, $R_f^2$ and $R_f^3$ are independently selected from the group consisting of linear and branched perfluorinated alkyls having 1–20 carbon atoms, and oxaperfluorinated polyethers having from about 4–20 carbon atoms; $R^1$ is a divalent hydrocarbyl radical; x is 1 to about 250 and, more preferably, 2 to about 100; y is 1 to about 250 and, more preferably, 2 to about 100; z is 1 to about 250 and, more preferably, 1 to about 100; and w is 1 to about 50 and, more preferably, 1 to about 5.

The FOX/THF coprepolymers described in this invention are difunctional and have terminal hydroxy groups. The hydroxy groups are primary hydroxy groups and, thus, they readily react with isocyanates to form high molecular weight polyurethane elastomers. In a typical reaction, the coprepolymer is reacted with an equivalent amount of polyisocyanate in the presence of a catalyst and a crosslinking agent to form a three-dimensional polymer network. If the functionality of the polyisocyanate is 2, then a crosslinking agent is needed to form a crosslinked network. However, if the functionality of the polyisocyanate is greater than 2, then no crosslinking agent is required. In some instances, additional crosslinking agent is added to improve the chemical and abrasion resistance of the polymer. The crosslinking agent normally used is a low molecular weight polyol or polyamine.

Polyisocyanates suitable for use in the synthesis of the FOX polyurethanes of the present invention include, but are not limited to, hexamethylene diisocyanate (HDI), isopherone diisocyanate (IPDI), methylene diphenylisocyanate (MDI), saturated MDI (Des-W), polymeric MDI, which are available from Dow Chemical Co. under the trademark ISONATE, a line of low-functionality isocyanates, toulene diisocyanate (TDI), polymeric HDI, which are available from Mobay Corporation, a Bayer Company, under the trademarks DESMODUR N-100, a solvent-free, aliphatic polyisocyanate resin basin based on hexamethylene diisocyanate, and DESMODUR N-3200, an aliphatic polyisocyanate resin based on hexamethylene diisocyanate, cyclohexylene-1,4-diisocyanate, and 2,2,4-trimethylhexmethylene diisocyanate. The NCO:OH ratio can range from about 1.1 to about 0.9 and, more preferably, the NCO:OH ratio is about 1.02.

The crosslinking agents normally used are low molecular weight polyols or polyamines. Examples of suitable crosslinking agents include, but are not limited to, trimethylolpropane, pentaerythritol, ISONOL® 93, trimethylolethane, triethanolamine, Jeffamines, 1,4-butanediamine, xylene diamine, diethylenetriamine, methylene dianiline, diethanolamine, etc. In preferred embodiments, trimethylolpropane, ISONOL® 93, methylene dianiline and Jeffamines are the crosslinking agents employed. The mechanical properties of the elastomers can be altered by varying the amount of crosslinking agent. Generally, increasing the amount of crosslinking agent in a polyurethane formulation leads to materials with higher modulus and improved chemical and abrasion resistance. The amount of crosslinking agent can be varied from about 0 to about 15% by weight and, more preferably, from about 1.5% to about 5% by weight.

Catalysts suitable for use in the present invention include, but are not limited to, triethylamine, triethylene diamine, triphenyl bismuth, chromium acetylacetonate, lead octonate, ferric acetylacetonate, tin octanoate, dibutyltin dilaurate and the like. In a preferred embodiment, the catalyst is dibutyltin dilaurate. It should be noted that the catalyst is added primarily to increase the rate of the reaction and, if desired, the reaction can be conducted in the absence of the catalyst. The catalyst concentration can range from about 0.001 to about 1% by wt. and, more preferably, from about 0.1% and 0.2% by wt.

As with the polyurethanes prepared from the FOX prepolymers, bulk materials are prepared by casting the above formulation in a mold, degassing the mixture, and then curing the mixture at a temperature ranging from about 20° C. to about 150° C. for about 3 to about 36 hours. In a presently preferred embodiment, the cure temperature is about 65° C. It is noted that the above formulation can be cured at room temperature by increasing the amount of catalyst to about 0.5%. The cure is also dependent on the thickness of the sample and the type of crosslinking agent employed. Thin samples cure within about 3 hours at 65° C., whereas ⅛ inch thick sample can take between about 8 to about 16 hours to cure. A thin-film is prepared by diluting the above formulation with THF, spreading the mixture over the substrate with, for example, a Doctor's blade, and then curing the coated substrate in an oven at 65° C. Alternatively, the substrate can be dip coated or spray coated and cured in an oven at 65° C. In addition, amine-based crosslinking agents promote faster cures than polyols.

In general, polyurethanes prepared from FOX/THF coprepolymers are tack-free, opaque elastomers. They exhibit glass transition temperatures of less than about −20° C., and typically have static contact angles with water between about 108° and about 126°. These materials are insoluble in common organic solvents, such as methanol, toluene, hexanes, carbon tetrachloride, methyl ethylketone and kerosene, but swell in THF and Freon™ 113. Such materials exhibit good to excellent adhesion to a variety of substrates, such as stainless steel (SS 304), graphite, EPDM rubber, aluminum and glass. Typically, the substrate is cleaned with water and acetone and then dried in an oven prior to use. Bonding is achieved by curing the mixture of prepolymer, crosslinking agent, polyisocyanate and catalyst directly on the substrate.

The studies carried out with respect to these polyurethanes indicate that the copolymerization of FOX monomers with THF not only reduces the cost of manufacturing fluorinated prepolymers, but also provides material with superior properties. Moreover, FOX/THF polyurethanes exhibit better adhesion and superior mechanical properties than FOX polyurethanes, while retaining the key properties of FOX polyurethanes, i.e., low glass transition temperature, high adhesion, processibility, high hydrophobicity, low coefficient of friction, low surface energy, etc.

As a result of their unique combination of properties, polyurethanes prepared from FOX/THF coprepolymers are useful as fouling release coatings; as abrasion resistant, low friction coatings for glass-run window channels, belts and windshield wipers; as bushing, gaskets, and engine mounts; as encapsulants for electronic devices; as binders for propellants and flares; as artificial joints; as dental materials; and as coatings for automotive, marine and industrial applications. The preferred applications are fouling release coatings, coatings for window channels, and binders for propellants and flares.

The invention will be described in greater detail by way of specific examples. The following examples are offered for illustrative purposes, and are not intended to limit the invention in any manner. Those of skill in the art will readily recognize a variety of noncritical parameters which can be changed or modified to yield essentially the same results.

EXAMPLES

A. Experimental Section

NMR analysis was performed on a Bruker MSL-300 spectrometer at 300 MHz in deutrochloroform solution with proton and carbon shifts in ppm relative to tetramethylsilane and fluorine shifts relative to fluorotrichloromethane. IR analysis by diffuse reflectance was performed on a Nicholet SX-5 spectrometer on KBr. Thermal analysis was performed on a Dupont DSC 9100 Analyzer.

B. Monomers

Example I

This example relates to the preparation and properties of 3,3-bis-(2,2,2-trifluoroethoxymethyl)oxetane (B6-FOX) using two different procedures.

i. Procedure A

Sodium hydride (50% dispersion in mineral oil, 18.4 g, 0.383 mol) was washed with hexanes (2x) and was suspended in DMF (200 mL). Then trifluoroethanol (38.3 g, 0.383 mol) was added dropwise over 45 min while hydrogen gas was evolved. The mixture was stirred for 30 min and a solution of 3,3-bis-(hydroxymethyl)oxetane di-p-toluenesulfonate (30.0 g, 0.073 mol) in DMF (50 mL) was added. The mixture was heated to 75° C. for 64 h when $^1$H NMR analysis of an aliquot showed that the starting sulfonate had been consumed. The mixture was poured into water and extracted with methylene chloride (2x). The combined organic extracts were washed with brine, 2% aqueous HCl, water, dried (MgSO$_4$), and evaporated to give 17.5 g (100%) of 3,3-bis-(2,2,2-trifluoroethoxymethyl) oxetane as an oil containing DMF (<1%). The oil was purified by bulb-to-bulb distillation at 42–48° C. (0.1 mm) to give 15.6 g (79%) of analytically pure B6-FOX, colorless oil: IR (KBr) 2960–2880, 1360–1080, 995, 840 cm$^{-1}$; $^1$H NMR δ3.87 (s 4H), 3.87 (q, J=8.8 Hz, 4H), 4.46 (s, 4 H); $^{13}$C NMR δ43.69, 68.62 (q, J=35 Hz), 73.15, 75.59, 123.87 (q, J=275 Hz); $^{19}$F NMR δ−74.6(s). Anal. Calcd. for C$_9$H$_{12}$F$_6$O$_3$: C, 38.31; H, 4.29; F, 40.40. Found: C, 38.30; H, 4.30; F, 40.19.

ii Procedure B

A 2 L round-bottom flask fitted with a mechanical stirrer, condenser and a thermometer was charged with 3,3-bis-(bromomethyl)oxetane (300 g, 1.2 mol), trifluoroethanol (284 g, 2.8 mol), tetrabutylammonium bromide (39.9 g, 0.12 mol) and water (265 mL). The mixture was heated to 85° C. and a 50% aqueous potassium hydroxide solution (672 g, 5.1 mol) was added via an addition funnel over a period of 3 h. The progress of the reaction was monitored by GLC and when greater than 99% of 3,3-bis-(bromomethyl)oxetane was consumed, the reaction mixture was cooled to room temperature and diluted with water (500 mL). The organic phase was separated and washed with 2% aqueous potassium hydroxide solution (500 mL) and water (500 mL). The crude product was then distilled under reduced pressure (bp=103° C./5 mm/Hg) to give 278 g (80%) of greater than 99% pure (GLC) 3,3-bis-(2,2,2-trifluoroethoxymethyl) oxetane, a colorless oil. Spectral analysis revealed that the product prepared by this process was identical with B6-FOX monomer prepared by Procedure A.

Example II

This example relates to the preparation and properties of 3,3-bis-(2,2,3,3,4,4,4-heptafluorobutoxymethyl)-3-methyloxetane (B14-FOX).

A 12 L, round-bottom flask fitted with a mechanical stirrer and a reflux condenser was charged with 3,3-bis-(bromomethyloxetane) (678 g, 2.8 moles), 2,2,3,3,4,4,4-heptafluorobutane-1-ol (1165 g, 5.82 moles), tetrabutylammonium bromid (55.4 g, 0.17 moles), and water (1200 mL). The mixture was heated to 85° C. and a solution of 50% aq. sodium hydroxide (640 g, 8.0 moles) was slowly added over a period of 4 h. The resulting mixture was then heated at about 100° C. for 16 h, at which point GLC analysis revealed that greater than 95% of the starting oxetane was consumed. The mixture was cooled to room temperature and the organic layer was separated. The organic layer was then washed with water (2×1000 mL), dried (MgSO$_4$), filtered and fractionally distilled under reduced pressure. The first fraction, boiling at 27° C./2 mm/Hg, consisted of unreacted heptafluorobutanol and was recycled. The second fraction boiling at 110° C./1 mm/Hg, was the desired product, i.e., B14-FOX (776 g, 83%). The product was greater than 99% pure as determined by GLC area % analysis, $^1$H NMR and $^{13}$C NMR. $^1$H NMR δ3.86 (s, 4 H), 3.93 (t, J=23.2 Hz, 4 H), 4.44 (s, 4 H); $^{13}$C NMR δ43.84, 68.03, 73.51, 77.61, 115.39, 115.84, 119.6; $^{19}$F NMR δ−81.61, −121.0, −128.2.

A sample of this material was purified by column chromatography to provide pure poly(B14-FOX) glycol. The crude mixture (10 g) of poly(B14-FOX) glycol and cyclic oligomers was filtered through a short silica gel plug using hexane and ethyl acetate as eluents. The desired poly(B14-FOX) glycol was present in the ethyl acetate fraction and was isolated in 42% yield by evaporating the solvent under reduced pressure. The product, a white wax, was found by GPC analysis to contain <0.5% cyclic material: GPC: M$_W$=9,047, PD=1.34; $^1$H NMR (CDCl$_3$/F$^{113}$/TFAA): δ3.39 (s, 4H), 3.59 (s, 4H), 3.87 (t, 13.5 Hz, 4H), and 4.40 (s, —CH$_2$OCOCF$_3$); $^{13}$C NMR: δ46.4, 68.5 (t), 70.1 and 72.1 (signals from carbon bearing fluorines are not included).

Example III

This example relates to the preparation and properties of 3,3-bis-(2,2,3,3,4,4,5,5,6,6,7,7,7-pentadecafluorooctyloxymethyl)oxetane (B30-FOX).

A mixture of 3,3-bis-(chloromethyl)oxetane (3.0 g, 19.4 mmol), pentadecafluorooctan-1-ol (16 g, 40 mmol), tetrabutylammonium bromide (13.2 g, 40 mmol), water (35 mL), and 50% aq. sodium hydroxide (3.5 g, 44 mmol) was heated at 100° C. for 48 h. The reaction mixture was diluted with Freon™ 113 (10 mL) and the organic phase was separated. The organic phase was then washed with water, dried (MgSO$_4$), filtered and stripped of solvent under reduced pressure to give 16.1 g of the crude produce. Kugelrohr distillation of the crude product under reduced pressure (120–125/0.2 mm/Hg) provided 13.8 g (82%) of B30-FOX, an oil; $^1$H NMR δ3.87 (s, 4 H), 3.93 (t, J=23.8 Hz, 4 H), 4.44 (s, 4 H).

Example IV

This example relates to the preparation and properties of 3,3-bis-(3,3,4,4,5,5,6,6,7,7,8,8,8-tridecafluorooctyloxymethyl)oxetane (B26-FOX).

A mixture of 3,3-bis-(iodomethyl)oxetane (4.3 g, 12.7 mmol), 3,3,4,4,5,5,7,7,8,8,8-tridecafluorooctan-1-ol (9.1 g, 25 mmol), tetrabutylammonium bromide (0.54 g, 1.7 mmol) water (7.5 mL) and 50% sodium hydroxide (4.9 g, 61.2 mmol) was heated at 100° C. for 16 h. The reaction mixture was diluted with a 1:1 mixture of Freon™ 113 and methylene chloride and the organic phase was separated and washed with water. The organic phase was then dried, filtered and stripped of solvent under reduced pressure to give 11 g of a yellowish brown oil. This oil was then distilled under reduced pressure as follows: fraction #1 (2.1 g), distilling at 85° C./0.8 mm/Hg, was unreacted alcohol; fraction #2, distilling at 140° C./0.5 mm/Hg, was the desired product, i.e., B26-FOX (6.5 g, 76%), an oil: $^1$H NMR (CDCl$_3$): δ2.85 (m, 4 H), 3.55 (m, 4 H), 3.80 (s, 4H), 4.40 (s, 4 H).

Example V

This example illustrates the preparation and properties of mixed 3,3-bis-substituted oxetane monomers.

A 12 L, round-bottom flask fitted with a mechanical stirrer and a reflux condenser was charged with 3,3-bis-(bromomethyloxetane) (683.2 g, 2.8 moles), 2,2,3,3,4,4,4-heptafluorobutan-1-ol (580 g, 2.9 moles), trifluoroethanol (290 g, 2.9 moles), tetrabutylammonium bromide (55 g, 0.17 moles) and 1.2 L of water. The mixture was heated to 85° C. and a solution of 50% aq. sodium hydroxide (320 g, 4 moles) was slowly added over a period of 4 h (6 moles). The resulting mixture was then heated at about 100° C. for 16 h, and then cooled to room temperature when the organic layer was separated. The organic phase was then washed with water (2×1000 mL), dried (MgSO$_4$), filtered and distilled under reduced pressure. Low boiling fractions were unreacted fluoroalcohols, while the remaining higher boiling fraction consisting of a mixture of 3,3-bis-substituted oxetanes: B6-FOX, B14-FOX and 3-(2,2,2-trifluoroethoxymethyl),3-(2,2,3,3,4,4-heptafluorobutoxymethyl)oxetane (M6-14-FOX)).

C. Pre-Polymers

The first two examples illustrate that homopolymerization of bis-substituted oxetane monomers provide polyether glycols that are crystalline with melting points greater than 20° C. It should be noted that polyether glycols produced by this process are contaminated with significant amounts of cyclic materials. Since cyclic materials can reduce the crystallinity of the polyether glycol via plasticization, complete removal of cyclic material is warranted prior to melting point determinations. Removal of cyclic materials can be achieved by chromatography.

1. Crystalline Polymers

Example I

This example illustrates the preparation and properties of poly[3,3-bis-(2,2,2-trifluoroethoxymethyl)oxetane] (poly (B6-FOX) glycol).

A 5 L round-bottom flask fitted with a mechanical stirrer, thermometer and an additional funnel was charged with a solution of trifluoroethanol (5.8 g, 0.058 mol) and boron trifluoride etherate (11.4 g, 0.81 mol) in methylene chloride (900 mL). The mixture was stirred at ambient temperature for 15 min and a solution of 3,3-bis-(2,2,2-trifluoroethoxymethyl)oxetane (1146 g, 4.1 mmol) in methylene chloride (485 mL) was added over a period of about 2.5 hours. The resulting mixture was then stirred at ambient temperature for 16 h at which time $^1$H NMR analysis of an aliquot indicated that the starting oxetane had been consumed. The reaction was quenched with water and the organic layer was washed with brine and 2% aqueous HCl. Evaporation of the solvent under reduced pressure afforded 1053 g (91%) of poly[3,3-bis-(2,2,2-trifluoroethoxymethyl)] oxetane, a white waxy solid: DSC: mp 71.7° C. ($\delta$H=26.35 Joules/g), decomposition >210° C.; GPC (THF): $M_W$=27, 000, polydisperity index (PDI)=2.2; $^1$H NMR 1.60 (m), 2.46 (s), 3.36 (s, 4 H), 3.58 (s, 4 H), 3.79 (q, 4 H); $^{13}$C NMR 45.49, 68.25 (q, J=33 Hz), 69.20, 70.97, 123.81 (q, J=280 Hz).

Example II

This example illustrates the preparation and properties of poly[3,3-bis-(2,2,3,3,4,4,4-heptafluorobutoxymethyl)oxetane] (Poly(B14-FOX) glycol).

In a manner similar to that described above, a solution of 3,3-bis-(2,2,3,3,4,4,4-heptafluorobutoxymethyl)oxetane (252 g, 523 mmol) in Freon™ 113 (75 mL) was added to a mixture of boron trifluoride etherate (1 g, 7.0 mmol) and trifluoroethanol (0.5 g, 5.0 mmol) in methylene chloride (175 mL) at ambient temperature. The resulting mixture was stirred at ambient for 46 hours, at which time $^1$H NMR analysis revealed that greater than 95% of starting oxetane monomer was consumed. The reaction was quenched with water and the prepolymer was precipitated into methanol to give, after drying, 221 g of a colorless oil. GPC analysis revealed that the oil was a mixture of about 70% poly(B14-FOX) glycol and 30% cyclic materials.

Example III

This example illustrates the preparation and properties of 3,3-bis-(1,1,2,2-tetrahydroperfluorooctylthiomethyl)-3-bromo-1-propanol (see, U.S. Pat. No. 5,097,048).

3,3-bis-(1,1,2,2-tetrahydroperfluoro-octylthiomethyl) oxetane (7.0 g, 0.0083 mol) was charged to a three-necked flask with hydrobromic acid (48%, 3.190.018 mol) and toluene (20.0 g). The reaction was heated at 100° C. under nitrogen with stirring for 4 h. The water/toluene azeotrope was then removed at 110° C. The solvent was then removed under vacuum to yield a thick brown liquid which is 99% pure by GLC. NMR showed proton resonances at 1.80 ppm, 1 proton, (—OH), 2.2–2.6 ppm, 4 protons, (2×$R_f$CH$_2$); 2.7–2.9 ppm, 8 protons, (2×CH$_2$SCH$_2$); 3.53 ppm, 2 protons, (CH$_2$Br); 3.65 ppm, protons, (CH$_2$OH). Analysis for CH$_{21}$H$_{17}$OS$_2$F$_{26}$Br: Calculated: C, 27.3%; H, 1.9%, Br, 8.7%, F, 53.5%, 7.0%; Found: C, 27.1%, H, 1.7%, Br, 9.1%, F, 51.5%, S, 7.1%.

2. Non-Crystalline Polymers

Examples I–VI illustrate the core of this invention, i.e., that is the crystalline nature of the bis-substituted oxetane homoprepolymers can be reduced by copolymerization of the bis-substituted oxetane monomers with either a mono-substituted oxetane monomer, an asymetrically substituted oxetane monomer or a nonfluorinated cyclic ether, such as THF. The resulting coprepolymers are amorphous, as indicated by the absence of crystallinity in DSC, and thus can be used as soft blocks in preparation of elastomers.

The copolymerization can be conducted in methylene chloride or in THF (in which case THF functions as a reactive solvent). The molecular weight of the coprepolymer is controlled by controlling the monomer:initiator ratio. For example, a monomer:initiator ratio of 20 should theoretically lead to a polyether glycol with a degree of polymerization (DP) of 20. The initiator used in this process is butanediol; however, water and variety of other alcohols have also been used successfully as initiators. Since water also functions very efficiently as an initiator and is difficult to remove completely, it is important to consider water as an initiator along with butanediol in molecular weight calculation. The amount of water in the monomer and solvents is easily measured by the Karl Fisher analysis. By proper molecular weight control, macro diols having bewteen 20 and 400 chemical bonds along the main polyether backbone are obtained that are useful for preparing elastomers.

The mole ratio of FOX and THF segments in the coprepolymer is easily established by $^1$H NMR analysis. However, it is somewhat more difficult to determine the ratio of two FOX comonomers in the coprepolymer by $^1$H NMR. However, this ratio can be established by the use of quantitative $^{13}$C NMR. Igated experim ents allow $^{13}$C-signals to be integrated reliably.

As described above, a preferred catalyst used in preparation of glycols is BF$_3$.THF, as the use of this catalyst allows for the preparation of difunctional materials. Moreover, a wide variety of initiators can be used. Such, initiators include, but are not limited to, water and those described above. In addition, a wide variety of solvents can be used. Suitable solvents include, but are not limited to, THF, chlorinated solvents, fluorinated solvents, toluene, heptane, tetrahydropyran, verarel (decafluoropentane which is commercially available from DuPont), trifluorotoluene, p-chlorotrifluorotoluene, esters, and the like. In a presently preferred embodiment, THF is used as the solvent, thereby eliminating the use of methylene chloride. Again, however, both chlorinated and fluorinated solvents can be used for the polymerization reaction. Preferred temperatures for carrying out the polymerization reactions range from about 25° C. to about 70° C., with higher temperatures tending to speed up the polymerization reaction.

Example I

This example illustrates the preparation and properties of a 70:30 coprepolymer of 3,3-bis-(2,2,3,3,4,4,4-heptafluorobutoxymethyl)oxetane and tetrahydrofuran [poly (B14-FOX/THF) (70:3 0) glycol].

A solution of butane-1,4-diol (328 mg, 3.64 mmol) and boron trifuloride tetrahydrofuranate (152 mg, 1.08 mmol) in tetrahydrofuran (3.1 g, 43 mmol) was stirred at 15° C. or 5 min, under nitrogen, in a dry polymerization flask. Then, 3,3-bis-(2,2,3,3,4,4,4-heptafluorobutoxymethyl)oxetane (20.0 g, 41.5 mmol) was added, and the resulting mixture was stirred at 15° C. for 24 h, at which time $^1$H NMR analysis of an aliquot indicated that the starting reagents were essentially unreacted. The solution was warmed to 65° C. for 3 h, at which time $^1$H NMR analysis of an aliquot indicated that the oxtane monomer was consumed. The reaction mixture was quenched with water, and the organic layer was separated and added to an equal volume of methanol. The methanol was decanted and the residual oil was dried in vacuo at ambient temperature to give 20.5 g (88%) of the title coprepolymer, an oil. GPC analysis revealed that the oil contained less than 2% cyclic materials. The equivalent weight of this material, as determined by $^1$H NMR TFAA end group analysis, was 2,879. (It is noted that in the foregoing analysis, the sample is dissolved in deuterochloroform in an NMR tube and is treated with excess triflyoroacetic anhydride. The trifluoroacetate of the end groups is formed in situ. The —CH$_2$— group next to the alcohol is moved 0.5 ppm down field away from the alcohol and can be integrated against the —CH$_2$— groups of the ether backbone to determine the equivalent weight.) The material was characterized as follows: DSC: T$_g$=−51° C., no other transitions observed; GPC: M$_W$=6600, polydispersity index (PDI)=1.7; $^1$H NMR analysis showed the oil was a 71:29 mole % mixture of B14-FOX and THF co-monomers.

Example II

This example illustrates the preparation and properties of a 90:10 coprepolymer of 3,3-bis-(2,2,3,3,4,4,4-heptafluorobutoxymethyl)oxetane and tetrahydrofuran having a medium molecular weight [poly(B14-FOX/THF) (91:9) glycol].

A solution of 1,4-butanediol (79 mg, 0.87 mmol) and boron trifluoride tetrahydrofuranate (0.27 g, 1.9 mmol) in methylene chloride (20 mL) was stirred at ambient temperature for 5 min, under nitrogen, in a dry polymerization flask. Next, a solution of 3,3-bis-(2,2,3,3,4,4,4-heptafluorobutoxymethyl)oxetane (83.4 g, 173 mmol) and tetrahydrofuran (2.5 g, 34.7 mmol) in Freon™ 113 (20 mL) was added and the resulting mixture was stirred at ambient temperature for 2 days. The progress of the reaction was monitored by $^1$H NMR and, on completion, the reaction mixture was quenched with water. The organic phase was separated and washed with water and added to an equal volume of methanol. The methanol layer was decanted and the residual oil was dried in vacuo at 35° C. to give 72.6 g of the title coprepolymer, an oil. $^1$H NMR analysis of the oil revealed that it was a 91:9 mole % mixture of two comonomers, 3,3-bis-(2,2,3,3,4,4,4-heptafluorobutoxymethyl)oxetane and tetrahydrofuran, respectively. The equivalent weight of the coprepolymer, as determined by $^1$H NMR TFAA end group analysis, was found to be 14,950. GPC: M$_W$=12,493, polydispersity index (PDI)=1.24, <0.5% cyclic tetramer; DSC: T$_g$=−53° C. The coprepolymer was a colorless oil that did not crystallize on storage at −20° C. for about 2 months.

Example III

This example illustrates the preparation and properties of a 90:10 coprepolymer of 3,3-bis-(2,2,3,3,4,4,4-heptafluorobutoxymethyl)oxetane and tetrahydrofuran having a low molecular weight [poly(B14-FOX/THF) (90:10) glycol].

A solution of 1,4-butanediol (1.92 g, 21.3 mmol) and boron trifluoride tetrahydrofuranate (0.93 g, 6.6 mmol) in methylene chloride (4 mL) was stirred at ambient temperature for 5 min, under nitrogen, in a dry polymerization flask. Next, a solution of 3,3,-bis-(2,2,3,3,4,4,4-heptafluorobutoxymethyl)oxetane (100 g, 207 mmol) in Freon™ 113 (20 mL) was added and the resulting mixture was stirred at ambient temperature for 2 days. The progress of the reaction was monitored by $^1$H NMR and, on completion, the reaction mixture was quenched with water. The organic phase was separated, washed with water, dried (MgSO$_4$), filtered and stripped of solvent under reduced pressure to give 114.9 g (97%) of the title coprepolymer, an oil. $^1$H NMR analysis of the oil revealed it was a 91:9 mole % mixture of two cocomonomers, 3,3-bis-(2,2,3,3,4,4,4-heptafluorobutoxymethyl)oxetane and THF, respectively. The equivalent weight of the coprepolymer, as determined by $^1$H NMR TFAA end group analysis, was 1,950: GPC: M$_W$=4175, polydispersity index (PDI)=1.24; DSC: T$_g$=−53° C. The coprepolymer was an oil and did not crystallize when stored at −20° C. for about 5 weeks.

Example IV

This example illustrates the preparation and properties of a 50:50 coprepolymer of 3,3-bis-(2,2,3,3,4,4,4-heptafluorobutoxymethyl)oxetane and 3-(2,2,3,3,4,4,4-heptafluorobutoxymethyl)-3-methyloxetane [poly(B14/7-FOX) (50:50) glycol].

A solution of butane-1,4-diol (791 mg, 8.8 mmol) and boron trifluoride tetrahydrofurnate (373 mg, 2.66 mmol) in methylene chloride (40 mL) was stirred at ambient temperature for 5 min, under nitrogen, in a dry polymerization flask. Then, 3-(2,2,3,3,4,4,4-heptafluorobutoxymethyl)-3-methyloxetane (21.5 g, 75.7 mmol) and bis-(2,2,3,3,4,4,4-heptafluorobutoxymethyl)oxetane (35.6 g, 73.8 mmol) in Freon™ 113 (20 g) was added in bulk, and the resultant mixture was stirred for 64 h at ambient temperature, at which time $^1$H NMR analysis of an alliquot indicated that the starting reagents were essentially consumed. The mixture was quenched with an equal volume of water containing 10% sodium bicarbonate. The organic layer was separated and washed sequentially with aqueous sodium bicarbonate, water and saturated brine solution. The residue was evaporated in vacuo at 50° C. to give a colorless oil. The oil was stirred for 16 h with hexane (75 mL), the hexane layer was decanted and the oil dried in vacuo at 50° C. to give 45 g (79%) of poly(B14/7-FOX) (50:50) glycol, an oil. 13C NMR analysis (Igated) revealed that the oil was a 50:50 mole % mixture of B14-FOX and 7-FOX co-monomers. The equivalent weight of the coprepolymer, as determined by 1H NMR TFAA analysis, was 2,650. The coprepolymer was characterized as follows: DSC: T$_g$−51° C.; GPC: M$_W$=5,673 polydispersity index (PDI)=1.7, $^{13}$C NMR: quaternary carbons observed at 41.41 and 46.05; $^{19}$F NMR: −82.02, −121.37, and −128.52.

The coprepolymer was an oil that did not crystallize on extended storage (about 2 months) at −20° C. DSC analysis also revealed that other than glass transition temperature (−52° C.), no other transitions were observed in the temperature range of −80 to 150° C.

Example V

This example illustrates the preparation and properties of a 80:20 coprepolymer of 3,3-bis-(2,2,3,3,4,4,4-heptafluorobutoxymethyl)oxetane and 3-heptafluorobutoxymehtyl-3-methyloxetane [poly(B14/7-FOX) (80:20) glycol].

A solution of 1,4-butanediol (0.55 g, 6.1 mmol) and boron trifluoride tetrahydrofuranate (0.26 g, 1.85 mmol) in methylene chloride (30 mL) was stirred at ambient temperature for 5 min, under nitrogen, in a dry polymerization flask. Next, a solution of 3,3-bis-(2,2,3,3,4,4,4-heptafluorobutoxymethyl)oxetane (40.0 g, 82.9 mmol) and 3-heptafluorobutoxymethyl-3-methyloxetane (5.9 g, 20.7 mmol) in Freon™ 113 (10.5 mL) was added and the resulting mixture was stirred at ambient temperature for 4 days and at 35° C. for 16 h. The progress of the reaction was monitored by $^1$H NMR and, on completion, the reaction mixture was quenched with water. The organic phase was separated and washed with equal volumes of water, dried (MgSO$_4$), filtered, and stripped of solvent under reduced pressure to provide 42.4 (91%) of the title coprepolymer, an oil: DSC: $T_g$–40° C., no other transitions observed; GPC: $M_W$32 4,200, polydispersity index (PDI)=1.25; $^1$H NMR (TFAA analysis): equivalent weight=2,050. The ratio of the two comonomers, 3,3-bis-(2,2,3,3,4,4,4-heptafluorobutoxymethyl)-3-methyloxetane and 3-heptafluoro-butoxymethyl)-3-methyloxetane, was determined to be 79:21 mole % by $^{13}$C NMR (Igated) analysis.

Example VI

This example illustrates the preparation and properties of a 80:20 coprepolymer of 3,3-bis-(2,2,2-trifluoroethoxymethyl)oxetane and 3-trifluoroethoxymethyl-3-methyloxetane [poly(B6/3-FOX) glycol].

A solution of 1,4-butanediol (5.5 g, 61 mmoles) and boron trifluoride tetrahydrofuranate (2.5 g, 18.6 mmoles) in methylene chloride (150 mL) was stirred at ambient temperature for 15 mins. Next, a solution of 3,3-bis(2,2,2-trifluoroethoxymethyl)oxetane (227 g, 805 mmol) and 3-trifluoroethoxymethyl-3-methyloxetane (38.3 g, 208 mmol) in Freon™ 113 (30 mL) was added, and the resulting mixture was stirred at ambient temperature for 1 day and at reflux for 2 days. The progress of the reaction was monitored by 1 H NMR and, on completion, the reaction mixture was quenched with water. The organic phase was separated and washed with water, dried (MgSO$_4$), filtered and stripped of solvent under reduced pressure to give 253 g (95%) of the title coprepolymer, a colorless oil. The ratio of two co-monomeric unis, 3,3-bis(2,2,2-trifluoroethoxymethyl)oxetane and 3-trifluoroethoxymethyl-3-methyloxetane, was determined to be 82:18 mole % by 13C NMR (Igated) analysis. The equivalent weight, as determin by 1H NMR TFAA analysis, was found to be 2,164.

Example VII

This example illustrates the preparation and polymerization of a 70:30 coprepolymer of M6–14-FOX and tetrahydrofuran [poly(M6-14-FOX/THF) (70:30) glycol].

A solution of butane-1,4-diol (3.6 mmol) and boron trifluroide tetrahydrofuranate (1.08 mmol) in 3.1 g of tetrahydrofuran was stirred at 15° C. for 5 min, under dry nitrogen, in a polymerization flask. M6-14-FOX (20.0 g) was added to the mixture and stirred at 15° C. for 2.5 h, then heated to 65° C. for 3 h. $^1$H NMR analysis of an aliquot indicated that the monomers were consumed. The reaction was quenched with an excess of water, the organic layer was separated and the coprepolymer separated by addition of an equal volume of methanol. After separating the methanol, the residual polymer oil was vacuum dried. GPC analysis revealed less than 2% cyclic materials. The equivalent weight of the glycol, as determined by $^1$H NMR TFAA end group analysis, was 3,000. The material exhibited a $T_g$ of –52° C. and no other transitions. GPC showed a polydispersity index (PDI) of 1.8.

3. Exemplar Coprepolymers

Using the methods described herein, bis-substituted FOX monomers were copolymerized with mono-substituted FOX monomers and THF. Examplar copolymers are set forth in Table 3.

TABLE 3

Copolymerization of Bis-substituted oxetane monomers

| Monomer A | Monomer B | Feed A:B Ratio (mole) | Mole Ratio (A:B) in Coprepolymer | $M_w$ (GPC) | Yield |
|---|---|---|---|---|---|
| B14-FOX | THF | 46:54 | 71:29 | 6,600 | 88% |
| B14-FOX | THF | 69:31 | 91:9 | 12,493 | 85% |
| B14-FOX | THF | 88:12 | 91:9 | 4,175 | 97% |
| B14-FOX | 7-FOX | 80:20 | 80:20 | 4,100 | 91% |
| B14-FOX | 7-FOX | 50:50 | 50:50 | 5,673 | 79% |

The properties and characteristics of the various coprepolymers were studied. As set forth in Table 4, both the coprepolymers formed from bis- and mono-substituted FOX monomers and from bis-substituted FOX monomers and THF are non-crystalline, i.e., they are amphorous oils.

TABLE 4

Poly(FOX) Glycols Based on Bis-Substituted Oxetanes

|  | B6-FOX | B14-FOX | B14/7-FOX | B14/7-FOX | B14/THF | B14/THF | B14/THF |
|---|---|---|---|---|---|---|---|
| Ratio of Co-monomers | 100 | 100 | 50:50 | 80:20 | 71:29 | 91:9 | 91:9 |
| Physical State | Wax | Wax | Oil | Oil | Oil | Oil | Oil |
| Eq. Wt. (NMR) | — | — | 2,650 | 2,052 |  | 1,950 | 7,474 |
| GPC:$M_w$ | 27,071 | 9,047 | 5,673 | 4,175 |  | 3,811 | 12,493 |
| $M_w/M_n$ | 2.2 | 1.4 | 1.73 | 1.25 |  | 1.27 | 1.24 |
| DCA:$\theta_{adv}$ | 104.0 | — | — | — | — | — | — |
| $\theta_{rec}$ | 89.3 | — | — | — | — | — | — |
| DSC mp ° C. | 71.7° C. |  | ND* | ND* | ND* | ND* | ND* |
| $\Delta$Hm | 26.3 J/gm |  | ND* | ND* | ND* | ND* | ND* |
| $T_g$ ° C. | –39 |  | –52 | –49 | –51 | –53 | –53 |

*Not Determined.

D. Polyurethanes

Example I

This example illustrates the preparation and properties of a thermoplastic polyurethane prepared from poly(B14/7-FOX) (50:50) glycol.

A 50 mL three-necked flask was dried under argon and charged with poly(B14/7-FOX) (50:50) glycol (3.42 g, 1.28 mmol, equivalent weight 2650), IPDI (464 mg, 4.05 mmol), LV-33/T12 catalyst in THF (62 mg), and THF (5 mL). The mixture was heated to reflux for 3.5 h, and then 1,4-butanediol (BDO) (111 mg, 2.47 m equiv) dissolved in THF (0.5 mL) and DMAC (1.5 mL) was added. The heating was continued for 3 h and the mixture was cooled to ambient temperature. The solution was used to dip coat glass slides. The slides were dried in an oven at 65° C. to give a smooth, colorless, tack-free coating. The coatings were analyzed by DCA and were found to exhibit an advancing contact angle of 127 degree and a receding contact angle of 41 degrees with water. The polyurethane was isolated by precipitating the polymer solution in methanol and collecting the precipitated material by filtration. The filtered material was dried in a vacuum oven at 40° C. for 16 h to give 3.72 g (86%) of the title polymer, a tack-free elastomer: GPC: $M_W$=25,532, polydispersity index (PDI)=3.1; DSC: $T_g$ =−47° C.

Example II

This example illustrates the preparation and properties of a thermoplastic polyurethane prepared from poly(M6-14-FOX/THF) (70:30) glycol.

A 100 mL three-necked flask was dried under argon and charged with 38.76 mmol of MDI and 10 mL DMAC. The mixture was heated to 60° C. and a solution of poly(M6-14-FOX/THF) (70:30) glycol (3.1 mmol) and dibutyltin dilaurate catalyst (48 mg) dissolved in 10 mL of THF was added. After reacting at 60° C. for 2 h, 34.86 mmol of 1,4 butanediol in 1 mL THF was added. 10 mL DMAc was added and the reaction was continued for 20 h at 65° C. After cooling to room temperature, 400 mL methanol was added to precipitate the polymer which was collected and dried. The polyurethane elastomer was dissolved as a 10 wt. % solution in DMAc and used to coat various substrates to give elastomeric tack-free castings. GPC analysis gave a $M_W$ of about 85,000 and a polydispersity index (PDI) of 2.4. DSC showed a $T_g$ at −50° C. and melting point of the hard segment at 200° C. to 230° C. DCA($H_2O$): $\theta_{adv}$=120 deg, $\theta_{rec}$=68 deg.

The increase in $M_W$ as measured by GPC from $M_W$=5,600 to 25,500 shows that there is hydroxyl functionality on at least 85% of the chain ends.

Example III

This example illustrates the preparation and properties of a thermoplastic polyurethane prepared from poly(B14/7-FOX) (80:20) glycol.

A 100 mL three-necked flask was dried under argon and charged with MDI (4.923 g, 38.76 mmol) and DMAC (10 mL). The mixture was heated to 65° C. and a solution of 80:20 poly(B14/7-FOX) glycol (6.4 g, 3.1 mmol, equivalent weight 2,052) and dibutyltin dilarate catalyst (48 mg) dissolved in THF (10 mL) was added. The mixture was heated at 65° C. for 1.5 h and treated with a solution of 1,4-butanediol (1.571 g, 34.86 mmol) in THF (1.0 mL). DMAC was added and the resulting mixture was heated at 65° C. for 20 h. The reaction mixture was cooled to ambient temperature and added to methanol (400 mL). The precipitated polymer was collected by filtration and dried in a vacuum oven at 40° C./30 mm/Hg/16 h to give 10.9 g (85%) of the title polyurethane, a white elastomer. The polyurethane elastomer was dissolved in DMAC (10% wt.) and the resulting lacquer was used for coating applications. Substrates, such as wood, glass, leather, rubber (EPDM rubber), fiber glass, stainless steel (304 and 316 SS), aluminum and fabrics, were coated with this solution and placed in an oven at 65° for 16 h. The resulting coatings were tack-free and elastomeric. The polyurethane was characterized as follows: DCA (H20): $\theta_{adv}$=116 deg, $\theta_{rec}$=68 deg; Surface Energy: 11.7 dynes/cm; GPC: $M_W$=83,657, polydispersity index (PDI) =2.34; DSC: $T_g$=−47C., melting endotherms at 208 and 225° C.

The increase in $M_W$ as measured by GPC from $M_W$=4,200 to 84,000 shows that there is hydroxyl functionality on at least 95% of the chain ends.

Example IV

This example illustrates the preparation of a thermoset polyurethane elastomer prepared from poly(B14/7-Fox) (80:20) glycol.

Poly(B14/7-Fox) (80:20) glycol (12.8 g, 6.2 meq, equivalent weight 2,052) was mixed with ISONOL-93 (1.08 g, 12.4 meq), and dibutyltin dilaurate (2 mg)in a beaker at 60° C. Des-W (2.60 g, 19.8 meq) was added and the mixing was continued at 60° C. for 15 mins, after which the contents were transferred into a TEFLON™ mold. The mold was placed in a vacuum oven and degassed (100° C. at 29 inch vacuum for 30 mins). The mixture was then cured at 65° C. for 46 h to give a tack free elastomer.

Example V

This example illustrates the preparation of a thermoset polyurethane elastomer prepared from poly(B14/7-FOX) (50:50) glycol.

Poly(B14/7-FOX) (50:50) glycol (13.68 g, 5.16 meq, equivalent weight=2,650) was mixed with ISONOL-93 (0.90 g, 10.3 meq), and dibutyltin dilaurate (3 mg)in a beaker at 60° C. Des-W (2.13 g, 16.2 meq) was added and the mixing was continued at 65° C. for 10 mins, after which the contents were transferred into a TEFLON™ mold. The mold was placed in a vacuum oven and degassed (100° C. at 29 inch vacuum for 30 mins). The mixture was then cured at 65° C. for 36 h to give a tack-free elastomer.

Example VI

This example illustrates the preparation and preparation of a thermoset polyurethane elastomer from poly(B14-FOX/THF) (90:10) glycol.

A 500 mL round-bottom three-necked flask was dried and assembled under argon with a condenser, thermacouple probe and magnetic stirring. The apparatus was charged sequentially with anhydrous dichloromethane (80 mL), 1,4-butanediol (1.9196 g, 21.3 mmol), boron trifluoride tetrahydrofuranate (0.9289 g, 6.64 mmol), and 3,3-bis(2,2,3,3,4,4,4-heptafluorobutoxymethyl)oxetane (118.20 g, 0.245 mol) in Freon™ 113 (40 mL). The solution was stirred at ambient temperature for 48 h at which time proton NMR analysis indicated that 95% of the monomer had been consumed. The reaction was quenched with aqueous sodium carbonate (50 mL), separated, and the organic phase was washed with aqueous hydrochloric acid (10%, 2×75 mL), water and brine. The organic solution was dried with magnesium sulfate and evaporated in vacuo to give 111.8 g (95%) of the prepolymer as a clear liquid. The crude polymer was found to have a molecular weight of 4,050 and $M_w/M_n$ of 1.25 by GPC and to contain less than 10% of low molecular weight oligomers. Proton NMR analysis showed the ratio of oxetane to tetrahydrofuran was 9.6 mole %. The equivalent weight was 1,948. 1H NMR 1.67 (s, 0.04 H), 1.85 (m, 0.03 H), 2.2 (m, 0.03 H), 3.44 (s, 4 H), 3.63 (m, 4 H), 3.88 (m, 4H).

Example VII

This example illustrates exemplar properties of the polyurethanes of the present invention. More particularly, Table 5 sets forth the properties of the polyurethanes prepared from the coprepolymers of the present invention.

TABLE 5

Polyurethanes from coprepolymers

|  | B14/7-FOX | B14/7-FOX | B14/THF |
|---|---|---|---|
| Ratio of comonomers | 50:50 | 80:20 | 91:9 |
| Curative | IPDI/BDO | MDI/BDO | MDI/BDO |
| State | Elastomer | Elastomer | Elastomer |
| % Hard Segment | 15% | 50% | 50% |
| GPC: $M_w$ | 25,532 | 83,657 | 22,656 |
| $M_w/M_n$ | 3.1 | 2.34 | 2.36 |
| DCA: $\theta_{adv}$ | 126 | 116.2 | 115.9 |
| $\theta_{rec}$ | 41 | 67.5 | 68.4 |
| Surface Energy | 9.8 dynes/cm | 11.7 dynes/cm | — |
| DSC $T_g$ ° C. | −47 | −47 & +105.4 | −51 & +113 |
| MP ° C. | ND* | 208 and 225 | 188 |
| $\Delta H_m$ (J/g) | ND* | 36.1 | ND* |

*Not Determined.

E. Structure

Table 6 sets forth the $^{13}$C NMR comparison of homo- and coprepolymers prepared using mono- and bis-substituted oxetanes. In addition, the copolymer of 7-FOX and B14-FOX was subjected to quantitative carbon ($^{13}$C) NMR spectroscopy using Igated decoupling techniques (see, Table 7). The quaternary carbons at 41.41 bearing one fluorinated group and a methyl group and at 46.05 due to the bis-fluorinated substituants were integrated and found to correspond to a ratio of 50.6 to 49.4. This is the correct ratio based on the monomer feeds for the copolymer. The signals from the quaternary carbons in the copolymers also appear as triads as expected for a random copolymer in which each one of two dissimilar monomers may appear adjacent to either similar to dissimilar monomers in the polymer backbone resulting from arrangements of AAB, BAB or AAA.

TABLE 6

$^{13}$C NMR Comparison of Homo- and Coprepolymers of Mono- and Bis-substituted Oxetanes

| Prepolymer | Quaternary Carbons | —CH$_3$ | —CH$_{2-R}$f | Other |
|---|---|---|---|---|
| Poly-7-FOX | 41.77 | 17.22 | 68.68 | 74.30, 75.95 |
| Poly B14-FOX | 46.24 | - | 68.45 | 70.0, 71.95 |
| Copoly 7/B14-FOX | 41.41 & 46.05 | 17.04 | 68.30 | Many peaks |

TABLE 7

Igated $^{13}$C NMR Experiments of B14- and 7-FOX Copolymers

| Copolymer | Wt. % of Monomers in Feed | Wt. % Found in Product by Igated 13C NMR |
|---|---|---|
| B14/7-FOX | 50:50 | 50.6:49.4 |
| B14/7-FOX | 80:20 | 79.4:20.6 |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A hydroxy-terminated FOX prepolymer comprising a monomeric unit having the general formula:

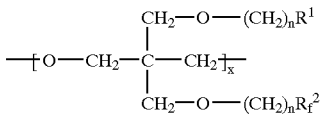

wherein:

each n is independently selected and is 1 to 3;

$R_f^1$ and $R_f^2$ are independently selected from the group consisting of linear perfluorinated alkyls, linear perfluorinated isoalkyls, branched chain perfluorinated alkyols, branched perfluorinated isoalkyls, said perfluorinated alkyls and isoalkyls having from 1 to about 20 carbon atoms, and oxaperfluorinated polyethers having from 4 to about 60 carbon atoms; and x is 1 to about 250; with the proviso that $R_f^1$ and $R_f^2$ are different.

2. A hydroxy-terminated FOX prepolymer in accordance with claim 1, wherein $R_f^1$ and $R_f^2$ are both linear perfluorinated alkyls.

3. A hydroxy-terminated FOX prepolymer in accordance with claim 2, wherein said FOX prepolymer is poly(3-(2,2, 2-trifluoroethoxymethyl)-3-(2,2,3,3,4,4,4-heptafluorobutoxymethyl)oxetane).

4. A hydroxy-terminated FOX prepolymer in accordance with claim 2, wherein said FOX prepolymer is poly(3-(2,2, 2-trifluoroethoxymethyl)-3-(3,3,4,4,5,5,6,6,7,7,8,8,8-tridecafluorooctyloxymethyl)oxetane).

5. A hydroxy-terminated FOX prepolymer in accordance with claim 2, wherein said FOX prepolymer is poly(3-(2,2, 3,3,4,4,4-heptafluorobutoxymethyl)-3-(2,2,3,3,4,4,5,5,6,6, 7,7,8,8,8-pentadecafluorooctyloxymethyl)oxetane).

6. A hydroxy-terminated FOX prepolymer in accordance with claim 2, wherein said FOX prepolymer is poly(3-(2,2, 2-trifluoroethoxymethyl)-3-(3,3,4,4,5,5,6,6,7,7,8,8,9,9,10, 10,10-heptadecafluorodecyloxymethyl)oxetane).

7. A hydroxy-terminated FOX prepolymer in accordance with claim 2, wherein said FOX prepolymer is poly(3-(2,2, 3,3,4,4,4-heptafluorobutoxymethyl)-3-(3,3,4,4,5,5,6,6,7,7, 8,8,9,9,10,10,11,11,12,12,12-heneicosafluorododecyloxymethyl)oxetane).

8. A hydroxy-terminated FOX prepolymer in accordance with claim 2, wherein x is from about 10 to about 50.

9. A hydroxy-terminated FOX coprepolymer comprising a mixture of monomeric units having the general formulae:

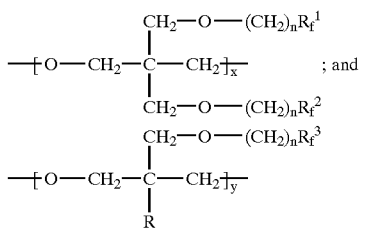

wherein:
each n is independently selected and is 1 to 3;
R is selected from the group consisting of methyl and ethyl;
$R_f^1$, $R_f^2$ and $R_f^3$ are independently selected from the group consisting of linear fluorinated alkyls, linear fluorinated isoalkyls, branched chain fluorinated alkyls, branched fluorinated isoalkyls, said fluorinated alkyls and isoalkyls having from 1 to 20 carbon atoms, and oxaperfluorinated polyethers having from 4 to about 60 carbon atoms;
x is 1 to about 250; and
y is 1 to about 250.

10. A hydroxy-terminated FOX prepolymer in accordance with claim 9, wherein $R_f^1$, $R_f^2$ and $R_f^3$ are linear perfluorinated alkyls.

11. A hydroxy-terminated FOX coprepolymer in accordance with claim 9, wherein $R_f^1$ and $R_f^2$ are the same.

12. A hydroxy-terminated FOX coprepolymer in accordance with claim 9, wherein $R_f^1$ and $R_f^2$ are different.

13. A hydroxy-terminated FOX coprepolymer in accordance with claim 9, wherein said hydroxy-terminated FOX coprepolymer is produced from the polymerization of at least one bis-substituted FOX monomer selected from the group consisting of 3,3-(2,2,2-trifluoroethoxymethyl) oxetane, 3,3-(2,2,3,3,4,4,4-heptafluorobutoxymethyl) oxetane, 3,3-(2,2,3,3,4,4,5,5,6,6,7,7,8,8,8-pentadecafluorooctyloxymethyl)oxetane, 3,3-(3,3,4,4,5,5,6, 6,7,7,8,8,8-tridecafluorooctyloxymethyl)oxetane, 3,3-(3,3, 4,4,5,5,6,6,7,7,8,8,9,9,10,10,10-heptadecafluorodecyloxymethyl)oxetane, 3,3-(3,3,4,4,5,5,6, 6,7,7,8,8,9,9,10,10,11,11,12,12,12-heneicosafluorododecyloxymethyl)oxetane, 3-(2,2,2-trifluoroethoxymethyl)-3-(2,2,3,3,4,4,4-heptafluorobutoxymethyl)oxetane and 3-(2,2,3,3,4,4,4-heptafluorobutoxymethyl)-3-(2,2,3,3,4,4,5,5,6,6,7,7,8,8,8-pentadecafluorooctyloxymethyl)oxetane, with at least one mono-substituted FOX monomer selected from the group consisting of 3-(2,2,2-trifluoroethoxymethyl)-3-methyloxetane, 3-(2,2,3,3,4,4,4-heptafluorobutoxymethyl)-3-methyloxetane, 3-(2,2,3,3,4,4,5,5,6,6,7,7,8,8,8-pentadecafluorooctyloxymethyl)-3-methyloxetane, 3-(3,3,4, 4,5,5,6,6,7,7,8,8,8-tridecafluorooctyloxymethyl)-3-methyloxetane, 3-(3,3,4,4,5,5,6,6,7,7,8,8,9,9,10,-10,10-heptadecafluorodecyloxymethyl)-3-methyloxetane, and 3-(3,3,4,4,5,5,6,6,7,7,8,8,9,9,-10,10,11,11,12,12,12-heneicosafluorododecyloxymethyl)-3-methyloxetane.

14. A hydroxy-terminated FOX coprepolymer in accordance with claim 13, wherein said bis-substituted FOX monomer is 3,3-(2,2,3,3,4,4,4-heptafluorobutoxymethyl) oxetane, and said mono-substituted FOX monomer is 3-(2, 2,3,3,4,4,4-heptafluorobutoxymethyl)-3-methyloxetane.

15. A hydroxy-terminated FOX coprepolymer in accordance with claim 13, wherein said bis-substituted FOX monomer is 3,3-(2,2,3,3,4,4,4-heptafluorobutoxymethyl) oxetane, and said mono-substituted FOX monomer is 3-(2, 2,2-trifluoroethoxymethyl)-3-methyloxetane.

16. A hydroxy-terminated FOX coprepolymer in accordance with claim 13, wherein said bis-substituted FOX monomer is 3,3-(2,2,2-trifluoroethoxymethyl)oxetane, and said mono-substituted FOX monomer is 3-(2,2,2-trifluoroethoxymethyl)-3-methyloxetane.

17. A hydroxy-terminated FOX coprepolymer in accordance with claim 9, wherein the ratio of said bis-substituted FOX monomer to said mono-substituted FOX monomer is in the range of from about 50:50 to about 95:5.

* * * * *

UNITED STATES PATENT AND TRADEMARK OFFICE
CERTIFICATE OF CORRECTION

PATENT NO. : 6,479,623 B1  Page 1 of 1
APPLICATION NO. : 09/615160
DATED : November 12, 2002
INVENTOR(S) : Aslam A. Malik et al.

It is certified that error appears in the above-identified patent and that said Letters Patent is hereby corrected as shown below:

Column 1, line 8, please insert:

-- STATEMENT OF FEDERALLY-SPONSORED RESEARCH

This invention was made with Government support under Contract N00014-99-C-0190 awarded by the Office of Naval Research. The Government has certain rights in the invention. --

Signed and Sealed this

First Day of September, 2009

David J. Kappos
*Director of the United States Patent and Trademark Office*